US010216405B2

(12) United States Patent
Markiewicz

(10) Patent No.: US 10,216,405 B2
(45) Date of Patent: Feb. 26, 2019

(54) PRESENTING CONTROL INTERFACE BASED ON MULTI-INPUT COMMAND

(71) Applicant: Microsoft Technology Licensing, LLC, Redmond, WA (US)

(72) Inventor: Jan-Kristian Markiewicz, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 414 days.

(21) Appl. No.: 14/922,117

(22) Filed: Oct. 24, 2015

(65) Prior Publication Data

US 2017/0115844 A1    Apr. 27, 2017

(51) Int. Cl.
| | | |
|---|---|---|
| G06F 3/048 | (2013.01) | |
| G06F 3/0488 | (2013.01) | |
| G06F 3/0482 | (2013.01) | |
| G06F 3/0484 | (2013.01) | |
| G06F 3/0354 | (2013.01) | |

(52) U.S. Cl.
CPC ........ *G06F 3/0488* (2013.01); *G06F 3/03545* (2013.01); *G06F 3/0482* (2013.01); *G06F 3/04845* (2013.01); *G06F 3/04883* (2013.01); *G06F 2203/04101* (2013.01); *G06F 2203/04807* (2013.01); *G06F 2203/04808* (2013.01)

(58) Field of Classification Search
CPC ......... G10L 13/00; G10L 13/08; G10L 13/02; G10L 15/187
See application file for complete search history.

(56) References Cited

U.S. PATENT DOCUMENTS

| | | | | |
|---|---|---|---|---|
| 8,077,153 B2* | 12/2011 | Benko | .................. | G06F 3/0488 345/173 |
| 8,217,904 B2* | 7/2012 | Kim | ...................... | G06F 3/0481 345/173 |
| 8,330,733 B2 | 12/2012 | Petschnigg et al. | | |
| 8,369,898 B2* | 2/2013 | Chun | .................... | G06F 3/0416 345/173 |
| 8,572,509 B2* | 10/2013 | Gobeil | .................. | G06F 3/0482 715/825 |
| 8,890,809 B2* | 11/2014 | Izumi | ..................... | G06F 3/017 345/157 |

(Continued)

OTHER PUBLICATIONS

Hinckley, et al., "Pen + Touch = New Tools", In Proceedings of the 23nd annual ACM symposium on User interface software and technology, Oct. 3, 2010, 10 pages.

(Continued)

*Primary Examiner* — Ryan F Pitaro
(74) *Attorney, Agent, or Firm* — Wade IP Law LLC

(57) ABSTRACT

Techniques are described herein that are capable of presenting a control interface based on (e.g., based at least in part on) a multi-input command. A multi-input command is a command that includes two or more inputs. Each of the inputs may be of any suitable type. For instance, any one or more of the inputs may be a touch input, a hover input, etc. Moreover, any one or more of the inputs may be a finger input, a pointing device input, etc. A finger input is an input in which a finger touches or hovers over a touch display module of a touch-enabled device. A pointing device input is an input in which a pointing device (e.g., a stylus) touches or hovers over a touch display module of a touch-enabled device.

20 Claims, 16 Drawing Sheets

(56) References Cited

U.S. PATENT DOCUMENTS

| | | | | |
|---|---|---|---|---|
| 8,994,674 | B2* | 3/2015 | Eguchi | G06F 3/04883 345/173 |
| 9,261,989 | B2* | 2/2016 | Kuscher | G06F 3/041 |
| 2004/0212617 | A1* | 10/2004 | Fitzmaurice | G06F 3/0481 345/440 |
| 2005/0226505 | A1* | 10/2005 | Wilson | G06F 3/0425 382/180 |
| 2006/0136840 | A1* | 6/2006 | Keely, Jr. | G06F 3/0483 715/808 |
| 2007/0008300 | A1* | 1/2007 | Yang | G06F 3/04886 345/173 |
| 2009/0247233 | A1* | 10/2009 | Kim | G06F 3/041 455/566 |
| 2010/0090964 | A1* | 4/2010 | Soo | G06F 3/0416 345/173 |
| 2010/0251112 | A1* | 9/2010 | Hinckley | G06F 3/0483 715/702 |
| 2010/0299638 | A1* | 11/2010 | Choi | G06F 3/04883 715/835 |
| 2011/0254806 | A1 | 10/2011 | Jung et al. | |
| 2011/0291952 | A1* | 12/2011 | Ketola | G06F 3/0488 345/173 |
| 2012/0050180 | A1* | 3/2012 | King | G06F 3/0416 345/173 |
| 2012/0154295 | A1 | 6/2012 | Hinckley et al. | |
| 2012/0262407 | A1* | 10/2012 | Hinckley | G06F 3/038 345/173 |
| 2013/0106898 | A1* | 5/2013 | Saint-Loubert-Bie | G06F 1/1626 345/592 |
| 2013/0212535 | A1* | 8/2013 | Kim | G06F 3/0482 715/841 |
| 2013/0222238 | A1* | 8/2013 | Sliger | G06F 3/0484 345/157 |
| 2013/0239059 | A1* | 9/2013 | Chen | G06F 3/0488 715/835 |
| 2013/0257777 | A1* | 10/2013 | Benko | G06F 3/03545 345/173 |
| 2014/0022193 | A1* | 1/2014 | Kim | G06F 3/0488 345/173 |
| 2014/0075388 | A1* | 3/2014 | Kuscher | G06F 3/0482 715/834 |
| 2014/0085259 | A1* | 3/2014 | Lee | G06F 3/0488 345/174 |
| 2014/0123079 | A1* | 5/2014 | Wu | G06F 3/017 715/863 |
| 2014/0139440 | A1* | 5/2014 | Qu | G06F 3/018 345/169 |
| 2014/0192016 | A1 | 7/2014 | Yoshino | |
| 2014/0282269 | A1* | 9/2014 | Strutt | G06F 3/04883 715/863 |
| 2014/0325443 | A1* | 10/2014 | Kim | G06F 3/0482 715/825 |
| 2014/0327634 | A1* | 11/2014 | Kim | G06F 21/50 345/173 |
| 2015/0109257 | A1* | 4/2015 | Jalali | G06F 3/0488 345/175 |
| 2015/0261330 | A1* | 9/2015 | Jalali | G06F 3/04815 345/173 |
| 2016/0054851 | A1* | 2/2016 | Kim | G06F 3/0488 345/174 |
| 2016/0062452 | A1* | 3/2016 | Kim | G06F 3/011 345/661 |
| 2016/0062515 | A1* | 3/2016 | Bae | G06F 3/0414 345/174 |
| 2016/0077663 | A1* | 3/2016 | Durojaiye | G06F 3/03545 345/173 |
| 2016/0106394 | A1* | 4/2016 | Kang | G06F 3/041 600/437 |
| 2016/0132211 | A1* | 5/2016 | Woo | G06F 3/04812 715/822 |
| 2016/0139731 | A1* | 5/2016 | Kim | G06F 3/0416 345/173 |
| 2016/0253047 | A1* | 9/2016 | Kim | G06F 3/0487 715/764 |
| 2016/0266654 | A1* | 9/2016 | Lehtiniemi | G06F 3/048 |
| 2016/0306543 | A1* | 10/2016 | Bang | G06F 3/04883 |
| 2016/0364089 | A1* | 12/2016 | Blackman | G06F 3/0482 |
| 2017/0060398 | A1* | 3/2017 | Rastogi | G06F 3/04847 |
| 2017/0090666 | A1* | 3/2017 | Pahud | G06F 3/0416 |
| 2017/0131786 | A1* | 5/2017 | Koshiyama | G06F 3/017 |
| 2017/0139556 | A1* | 5/2017 | Josephson | G06F 3/0482 |
| 2017/0197637 | A1* | 7/2017 | Yamada | B60W 50/10 |
| 2017/0277367 | A1* | 9/2017 | Pahud | G06F 3/04883 |
| 2017/0277413 | A1* | 9/2017 | Kim | G06F 3/04845 |
| 2017/0300205 | A1* | 10/2017 | Villa | G06F 3/0484 |
| 2018/0173407 | A1* | 6/2018 | Kim | G06F 3/04845 |

OTHER PUBLICATIONS

Kim, et al., "AR Pen and Hand Gestures: A New Tool for Pen Drawings", In Proceedings of Extended Abstracts on Human Factors in Computing Systems, Apr. 27, 2013, pp. 943-948.

Foucault, et al., "SPad: A Bimanual Interaction Technique for Productivity Applications on Multi-Touch Tablets", In Proceedings of Extended Abstracts on Human Factors in Computing Systems, Apr. 26, 2014, pp. 1879-1884.

Matulic, et al., "Pen and Touch Gestural Environment for Document Editing on Interactive Tabletops", In Proceedings of the ACM international conference on Interactive tabletops and surfaces, Oct. 6, 2013, pp. 41-50.

Matulic, et al., "Supporting Active Reading on Pen and Touch-Operated Tabletops", In Proceedings of the International Working Conference on Advanced Visual Interfaces, May 21, 2012, pp. 612-619.

Brandl, et al., "Combining and Measuring the Benefits of Bimanual Pen and Direct-Touch Interaction on Horizontal Interfaces", In Proceedings of the working conference on Advanced visual Interfaces, May 28, 2008, 8 pages.

Hinckley, et al., "Motion and Context Sensing Techniques for Pen Computing", In Proceedings of Graphics Interface, May 29, 2013, pp. 71-78.

Frisch, et al., "Investigating Multi-Touch and Pen Gestures for Diagram Editing on Interactive Surfaces", In Proceedings of the ACM International Conference on Interactive Tabletops and Surfaces, Nov. 23, 2009, 8 pages.

"Atmel", Published on: Feb. 8, 2012, 2 pages, Available at: http://www.atmel.com/microsite/stylus/default.aspx Hinckley, et al., Manual Deskterity: An Exploration of Simultaneous Pen + Touch Direct Input, In Proceedings of Extended Abstracts on Human Factors in Computing Systems, Apr. 10, 2010, pp. 2793-2802.

Wagner, et al., "BiTouch and BiPad: Designing Bimanual Interaction for Hand-held Tablets", In Proceedings of the SIGCHI Conference on Human Factors in Computing Systems, May 5, 2012, pp. 2317-2326.

"Invitation to Pay Additional Fee Issued in PCT Application No. PCT/US2016/057314", Mailed Date: Jan. 27, 2017, 7 Pages.

* cited by examiner

PRESENTING CONTROL INTERFACE BASED ON MULTI-INPUT COMMAND

BACKGROUND

Touch-enabled devices have captured a substantial share of the computer market in recent years. A touch-enabled device is a device that is capable of detecting touch commands. A touch command is a command in which an object, such as a finger, physically touches a touch display module of a touch-enabled device. Some touch-enabled devices have an associated stylus (e.g., a pen), which may be used to provide the touch commands.

A user's hand often travels a relatively long distance to provide a touch command. Thus, conventional user interface (UI) commanding techniques for touch and stylus interfaces may be relatively inefficient. Moreover, the conventional UI commanding techniques may be limited to use with relatively large touch targets that stay on a touch screen of the touch display module.

A variety of techniques has been proposed for presenting a control interface on a touch-enabled device. However, each such technique has its limitations. For instance, a first technique utilizes UI controls that are always visible. However, the UI controls typically are in a fixed location and consume a substantial portion of the touch screen of the touch-enabled device. A second technique utilizes a floating toolbar, which includes the UI controls. Although the UI controls in a floating toolbar may be positioned closer to a user's hand, the UI controls still typically consume a substantial portion of the touch screen. Furthermore, movement of the toolbar is performed manually by the user when the user desires to see a portion of the touch screen that is obstructed by the toolbar. A third technique utilizes a contextual command gesture, such as a press-and-hold gesture, to launch the UI controls. However, such gestures often are used to control objects on the touch screen, and therefore may not be available for launching the UI controls. Moreover, contextual command gestures typically are timed gestures and therefore may consume a substantial amount of time to perform, which may delay the launch of the UI controls. Furthermore, the UI controls usually are closed manually by the user when the user desires to see a portion of the touch screen that is obstructed by the toolbar.

SUMMARY

Various approaches are described herein for, among other things, presenting a control interface based on (e.g., based at least in part on) a multi-input command. A multi-input command is a command that includes two or more inputs. Each of the inputs may be of any suitable type. For instance, any one or more of the inputs may be a touch input, a hover input, etc. A touch input is an input in which an object, such as a finger or a pointing device (e.g., an electronic pointing device), physically touches a touch display module of a touch-enabled device. A hover input is an input in which an object hovers over a touch display module of a touch-enabled device. Accordingly, the hover input occurs without the object physically touching the touch display module. Moreover, any one or more of the inputs may be a finger input, a pointing device input, etc. A finger input is an input in which a finger touches or hovers over a touch display module of a touch-enabled device. A pointing device input is an input in which a pointing device (e.g., a stylus) touches or hovers over a touch display module of a touch-enabled device.

In a first example approach, a finger input of a finger is detected by first sensor(s) of a plurality of sensors that are included in a touch display module of a touch-enabled device. A pointing device that is in a hover position with regard to the touch display module is detected by second sensor(s) of the plurality of sensors. Any one or more of the second sensor(s) and any one or more of the first sensor(s) may be the same or different. A control interface is caused to be presented on a touch screen of the touch display module based on detecting the finger input and further based on detecting the pointing device in the hover position.

In a second example approach, a touch input that results from contact of an object with a surface of a touch display module of a touch-enabled device is detected by first sensor(s) of a plurality of sensors that are included in the touch display module. A hover input that results from a pointing device hovering a spaced distance from the touch display module is detected by second sensor(s) of the plurality of sensors. The control interface is caused to be presented via the surface of the touch display module based on detecting the touch input and further based on detecting the hover input.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
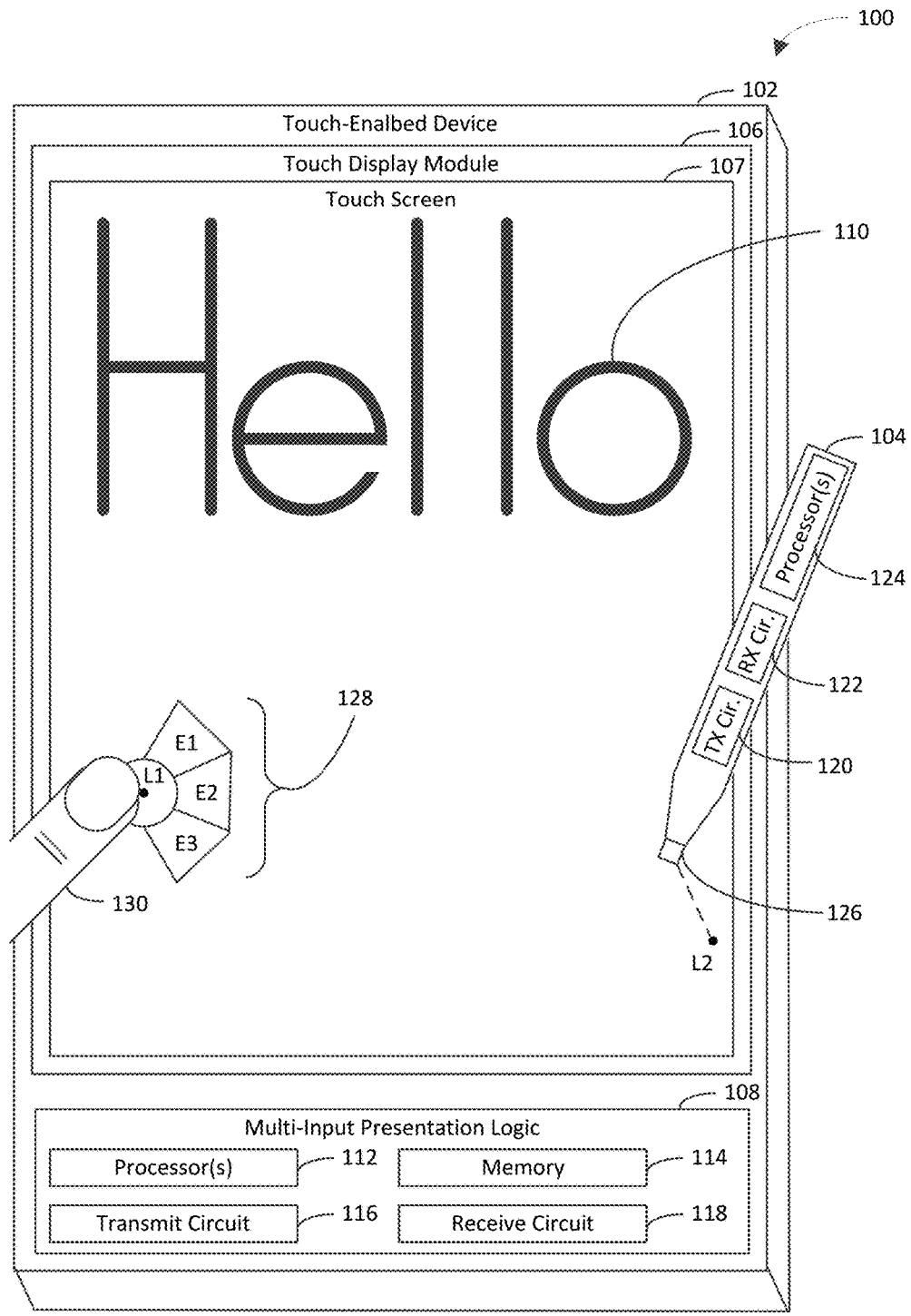
FIGS. 1-8 and 14 are block diagrams of example touch-enabled devices having multi-input presentation functionality in accordance with embodiments.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Moreover, words such as "first" and "second" are used herein for purposes of discussion and are not intended to designate an order (temporal or otherwise), unless affirmatively described as designating an order.

II. Example Embodiments

Example embodiments described herein are capable of presenting a control interface based on (e.g., based at least in part on) a multi-input command. A multi-input command is a command that includes two or more inputs. Each of the inputs may be of any suitable type. For instance, any one or more of the inputs may be a touch input, a hover input, etc. A touch input is an input in which an object, such as a finger or a pointing device (e.g., an electronic pointing device), physically touches a touch display module of a touch-enabled device. A hover input is an input in which an object hovers over a touch display module of a touch-enabled device. Accordingly, the hover input occurs without the object physically touching the touch display module. Moreover, any one or more of the inputs may be a finger input, a pointing device input, etc. A finger input is an input in which a finger touches or hovers over a touch display module of a touch-enabled device. A pointing device input is an input in which a pointing device (e.g., a stylus) touches or hovers over a touch display module of a touch-enabled device.

Example techniques described herein have a variety of benefits as compared to conventional techniques for presenting a control interface on a touch-enabled device. For instance, the example techniques may be capable of improving the functioning of the touch-enabled device. In one example, such techniques may increase the efficiency and/or speed with which the touch-enabled device operates. In another example, such techniques may reduce a latency that is common among the conventional techniques for presenting a control interface. The example techniques may be capable of improving a user experience with regard to presenting a control interface on a touch-enabled device.

The above-mentioned benefits may be obtained, for example, by reducing an amount of time that is consumed to present the control interface on the touch-enabled device. For instance, the example techniques may reduce a distance that a user's hand travels to provide touch and/or hover inputs. The reduction of this distance may result in the touch-enabled device consuming less time and/or fewer resources to present the control interface. Accordingly, UI commanding techniques that are implemented in accordance with the teachings herein may be characterized by an increased efficiency and/or speed, as compared to conventional UI commanding techniques. Moreover, the inputs described herein may be performed relatively quickly, as compared to the contextual command gestures which are used by some conventional techniques. Thus, using a multi-input command as described herein may reduce a time that is consumed to launch the UI controls.

The example techniques may be applicable to touch targets having a smaller size than the touch targets to which the conventional techniques apply. A touch target is an interface or an interface element for which selection of the interface or the interface element via a touch input initiates an action. For instance, a touch target may be a control interface, control element(s) therein, and/or menu(s) that are available via such control element(s).

The example techniques may enable any one or more items, such as the control interface, control element(s) therein, and/or menu(s) that are available via such control element(s), to be presented on demand. Presentation of any one or more of the items may be discontinued automatically in response to the user discontinuing engagement with the item(s) (e.g., without a need for the user to perform an affirmative action to have the item(s) removed from the touch screen). For instance, the user may discontinue engagement with an item by moving an object, such as a finger or a pointing device, with which engagement with the item was initiated away from the item. Accordingly, the user may simply discontinue engagement with the item to see a portion of the touch screen that is obstructed by the item.

The example techniques may be capable of using a multi-input command to cause the control interface to be presented on the touch screen. The multi-input command includes multiple inputs. These inputs may be different from inputs that are designated to control objects on the touch screen. Accordingly, the example techniques may increase a likelihood that the inputs described herein are available for launching UI controls. A location of the control interface on the touch screen may be selected from a variety of possible locations on the fly at the time the control interface is presented on the touch screen based on attribute(s) associated with at least one of the inputs that are included in the multi-input command. Accordingly, the control interface may not obstruct a portion (or all) of the touch screen while the control interface is not in use.

FIG. 1 is a perspective view of an example system 100 in accordance with an embodiment. The system 100 includes a touch-enabled device 102 and a pointing device 104. The touch-enabled device 102 is a processing system that is capable of receiving input from objects. Examples of an object from which input may be received include but are not limited to a finger 130 and the pointing device 104. An example of a processing system is a system that includes at least one processor that is capable of manipulating data in accordance with a set of instructions. For instance, a processing system may be a computer (e.g., a tablet computer, a laptop computer, or a desktop computer) or a personal digital assistant.

The touch-enabled device 102 includes a touch display module 106 and multi-input presentation logic 108. The touch display module 106 may include any of a variety of components, including but not limited to a touch/stylus sensor, touch/stylus electronics, a backlight, display electronics, cover glass, circuit boards, flexible printed circuits, and adhesive layers. For instance, the touch display module 106 is configured to include a touch screen 107.

The multi-input presentation logic 108 includes processor(s) 112, a memory 114, a transmit circuit 116, and a receive circuit 118. Touch and/or hover functionality of the touch display module 106 is enabled by the receive circuit 118, which is capable of sensing objects, such as the finger 130 and/or the pointing device 104, that are placed proximate the touch display module 106. For example, the receive circuit 118 may sense a location at which an object physically touches the touch display module 106. In accordance with this example, no space is between the object and the touch display module 106. For instance, there may be no space between the object and the cover glass of the touch display module 106. In another example, the receive circuit 118 may sense a location at which an object hovers over the touch display module 106. In accordance with this example, the object and the touch display module 106 are spaced apart and do not touch. The receive circuit 118 receives input from such objects via active and/or passive signals at locations on the touch display module 106 that correspond to locations of the objects. The touch display module 106 includes pixels having characteristics that are capable of being modified in response to receipt of such input at the locations on the touch display module 106 that correspond to the pixels.

The processor(s) 112 are capable of performing operations based on instructions that are stored in the memory 114 (e.g., in response to receipt of input from the finger 130 and/or the pointing device 104). For example, the processor(s) 112 may be configured to determine a location of the finger 130 based on input that is received by the receive circuit 118 from the finger 130. In another example, the processor(s) 112 may be configured to determine a location of an electrodes 126, which is included in the pointing device 104, based on input that is received by the receive circuit 118 from the pointing device 104. The processor(s) 112 are capable of modifying one or more characteristics of the pixels in the touch display module 106 in response to such input. As shown in FIG. 1, the processor(s) 112 have caused writing 110 to be displayed on the touch display module 106 by changing characteristic(s) of the corresponding pixels in the touch display module 106. More particularly, the processor(s) 112 have caused the word "Hello" to be displayed on the touch screen 107 in response to the electrode 126 of the pointing device 104 tracing the word "Hello" along a path that is proximate the touch display module 106.

The memory 114 stores computer-readable instructions that are executable by the processor(s) 112 to perform operations. The memory 114 may include any suitable type of memory, including but not limited to read only memory (ROM), random access memory (RAM), or flash memory.

The transmit circuit 116 is configured to generate a signal (e.g., a time-varying signal) for transmission to the pointing device 104. For example, the transmit circuit 116 may transmit the signal to the pointing device 104 in anticipation of a response from the pointing device 104. In accordance with this example, if the electrode 126 is configured to be a passive slug, the signal that is transmitted by the transmit circuit 116 may be a time-varying voltage, and the response from the pointing device 104 may be a time-varying current that is generated based on a capacitance between the touch display module 106 and the electrode 126. A passive slug is conductive material via which active signals are not transmitted. Rather, passive signals may be transmitted via a passive slug. For instance, the passive slug may respond to signal(s) that are received from the transmit circuit 116 by providing passive signal(s) that are based on the received signal(s).

The pointing device 104 includes the aforementioned electrode 126, a transmit circuit 120, a receive circuit 122, and processor(s) 124. The electrode 126 is electrically conductive to facilitate tracking of the electrode 126 by the touch-enabled device 102.

The transmit circuit 120 is configured to transmit an input to the touch-enabled device 102 to cause the processor(s) 112 to determine a location of the electrode 126.

The receive circuit 122 is configured to receive signals that are transmitted by the transmit circuit 116 of the touch-enabled device 102. For instance, the receive circuit 122 may forward the signals to the processor(s) 124 for processing.

The processor(s) 124 are configured to generate the input that is transmitted to the touch-enabled device 102 via the transmit circuit 120.

A control interface 128 is shown to appear on the touch screen 107 of the touch-enabled device 102 in FIG. 1 in response to the finger 130 being placed proximate the touch display module 106. For example, the multi-input presentation logic 108 may cause the control interface 128 to be presented on the touch screen 107 in response to a determination that the finger 130 touches or hovers over the touch display module 106.

In an example embodiment, the finger 130 physically touches the touch display module 106 at a first time instance. The pointing device 104 hovers over the touch display module 106 at a second time instance that is subsequent to the first time instance while the finger 130 is physically touching the touch display module 106. In accordance with this embodiment, the multi-input presentation logic 108 causes the control interface 128 to appear on the touch screen 107 in response to the pointing device 104 hovering over the touch display module 106 while the finger 130 is physically touching the touch display module 106.

The control interface 128 includes interface elements E1, E2, and E3, which may be configured to be selectable. For instance, each of the interface elements E1, E2, and E3 may be selected by placing the pointing device 104 (e.g., the electrode 126 of the pointing device 104) proximate the respective interface element. In one example, an interface element may be selected by physically touching the electrode 126 of the pointing device 104 to a location on the touch display module 106 that corresponds to the interface element. In another example, an interface element may be selected by hovering the electrode 126 of the pointing device 104 over a location on the touch display module 106 that corresponds to the interface element. The control interface 128 is shown in FIG. 1 to include three interface elements E1, E2, and E3 for illustrative purposes and is not intended to be limiting. It will be recognized that the control interface 128 may include any suitable number of interface elements (e.g., 1, 2, 3, or 4).

The control interface 128 is shown in FIG. 1 to correspond to a first location, L1, on the touch display module 106. The pointing device 104 (e.g., the electrode 126 of the pointing device 104) is shown to correspond to a second location, L2, on the touch display module 106. The multi-input presentation logic 108 may be configured to cause the control interface 128 to be presented on the touch screen 107 in response to a determination that a distance between the first location, L1, and the second location, L2, is less than or equal to a threshold distance, though the scope of the example embodiments is not limited in this respect.

Further details regarding some example embodiments in which a control interface is presented based on a multi-input command are provided below with reference to FIGS. 2-12.

Each of the touch-enabled device 102 and the pointing device 104 may be electrically connected to a common DC ground, though the scope of the example embodiments is not limited in this respect. For instance, the touch-enabled device 102 and the pointing device 104 may have capacitively coupled grounds, which may be achieved by a user grasping the touch-enabled device 102 and the pointing device 104.

Figure 2:
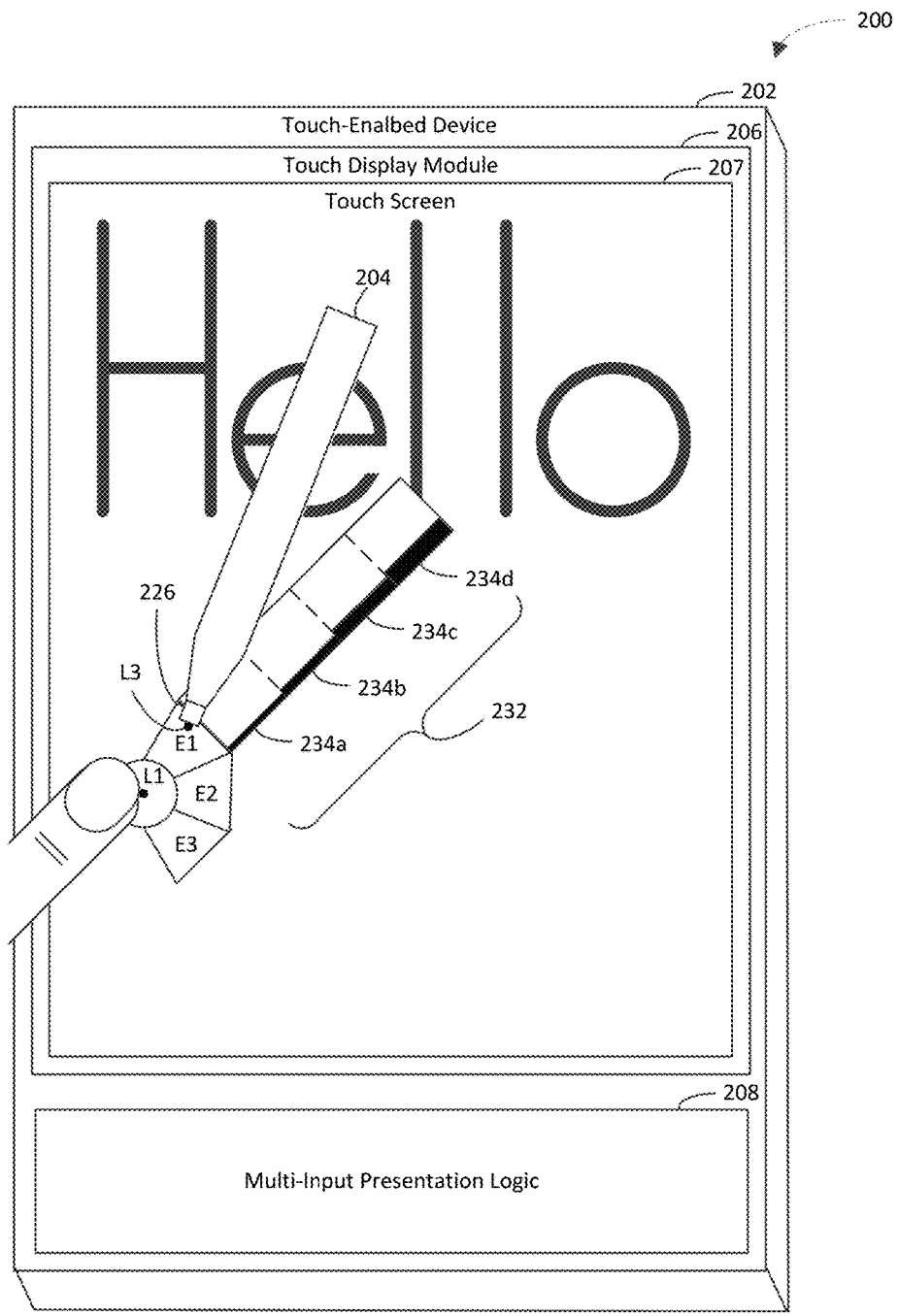
Figure 3:
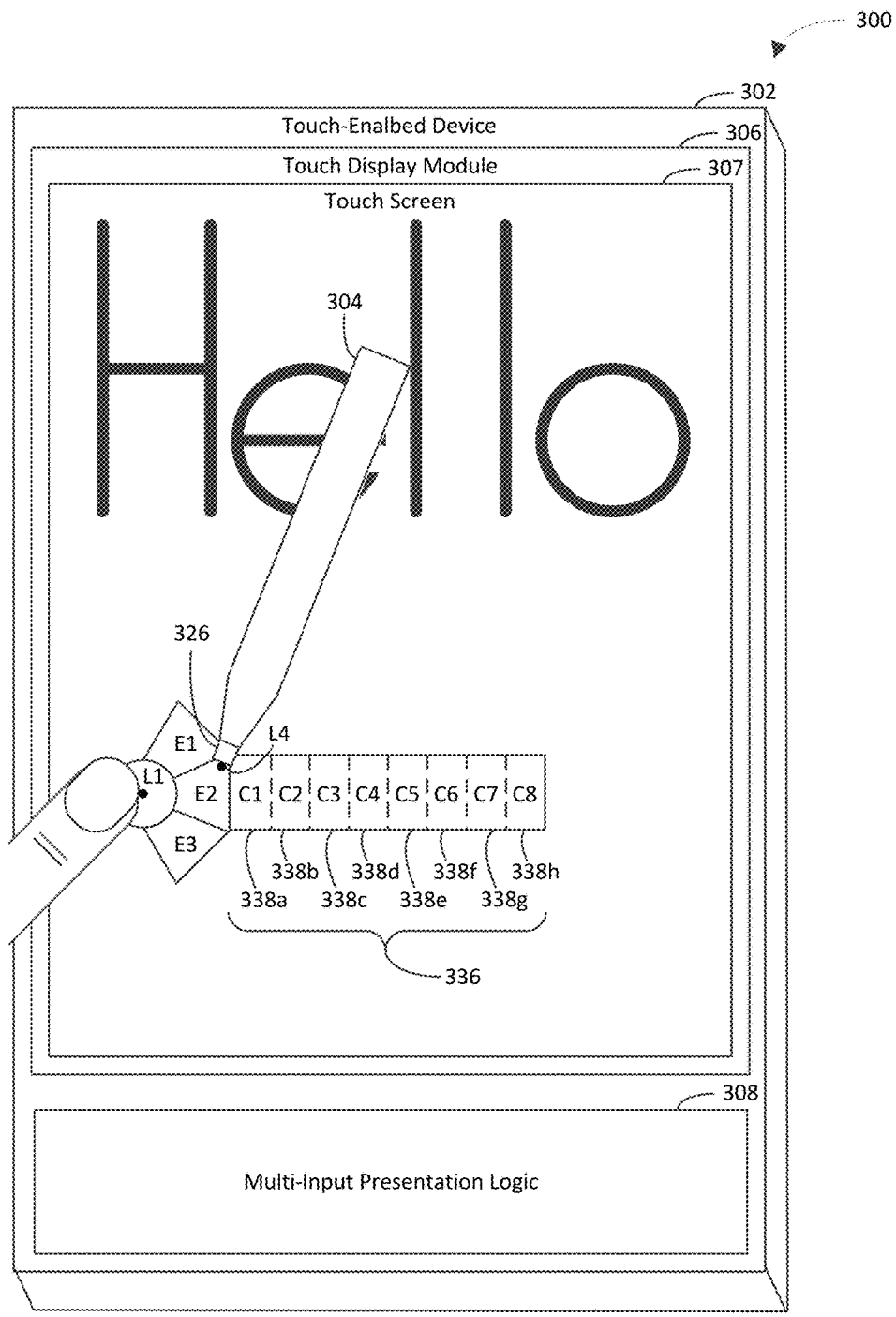
Figure 4:
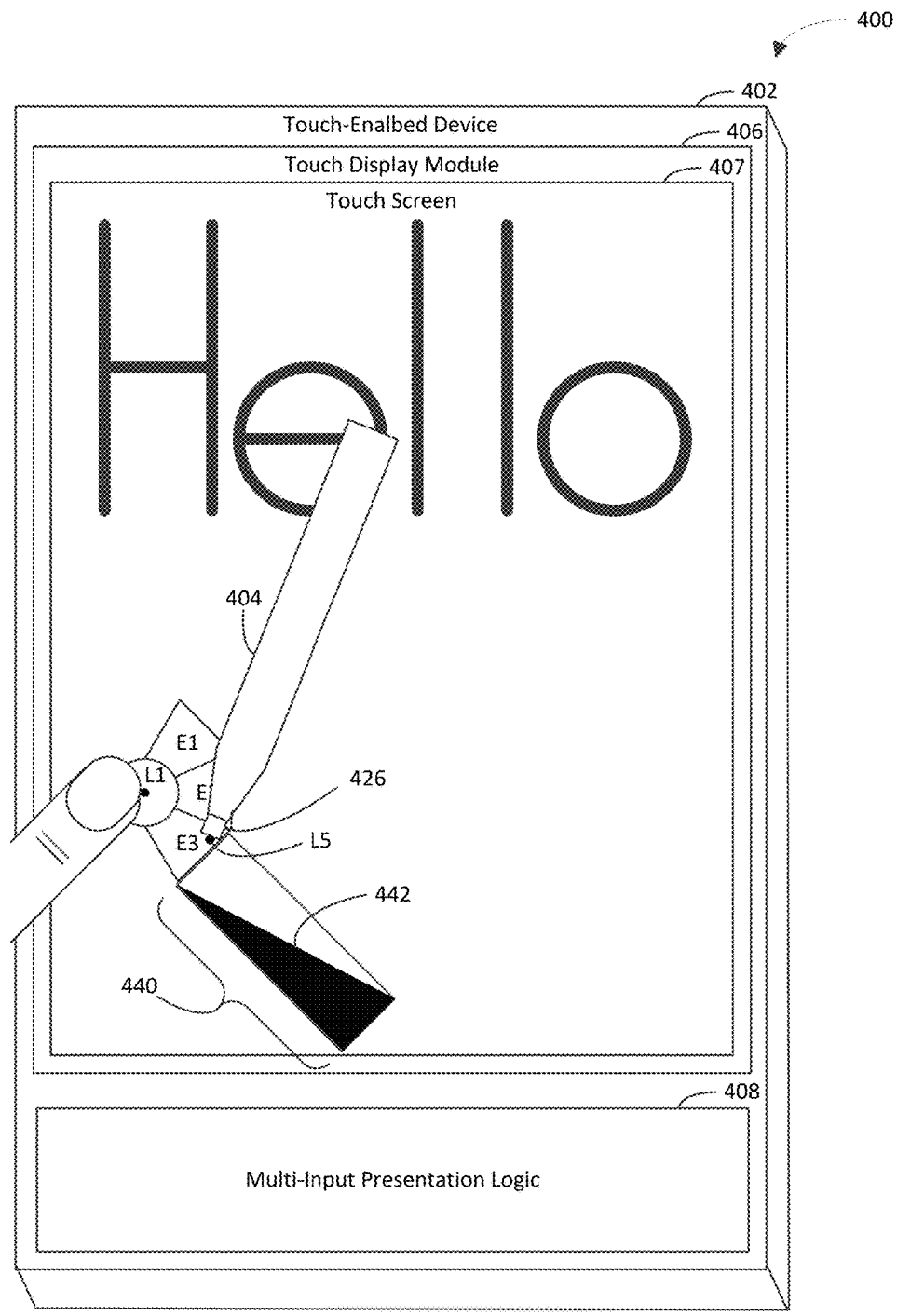

In some example embodiments, the interface elements E1, E2, and E3 shown in FIG. 1 correspond to respective attributes of writing (e.g., writing 110), which the multi-input presentation logic 108 is configured to present on the touch screen 107 as the pointing device 104 (e.g., the electrode 126 of the pointing device 104) is moved proximate a surface of the touch display module 106. For instance, in an example writing embodiment, interface element E1 corresponds to a line thickness of the writing; interface element E2 corresponds to a color of the writing; and interface element E3 corresponds to an opacity of the writing. FIGS. 2-4 show example implementations of this writing embodiment in which the respective interface elements E1, E2, and E3 are selected. FIGS. 2-4 are discussed in further detail below.

Figure 5:
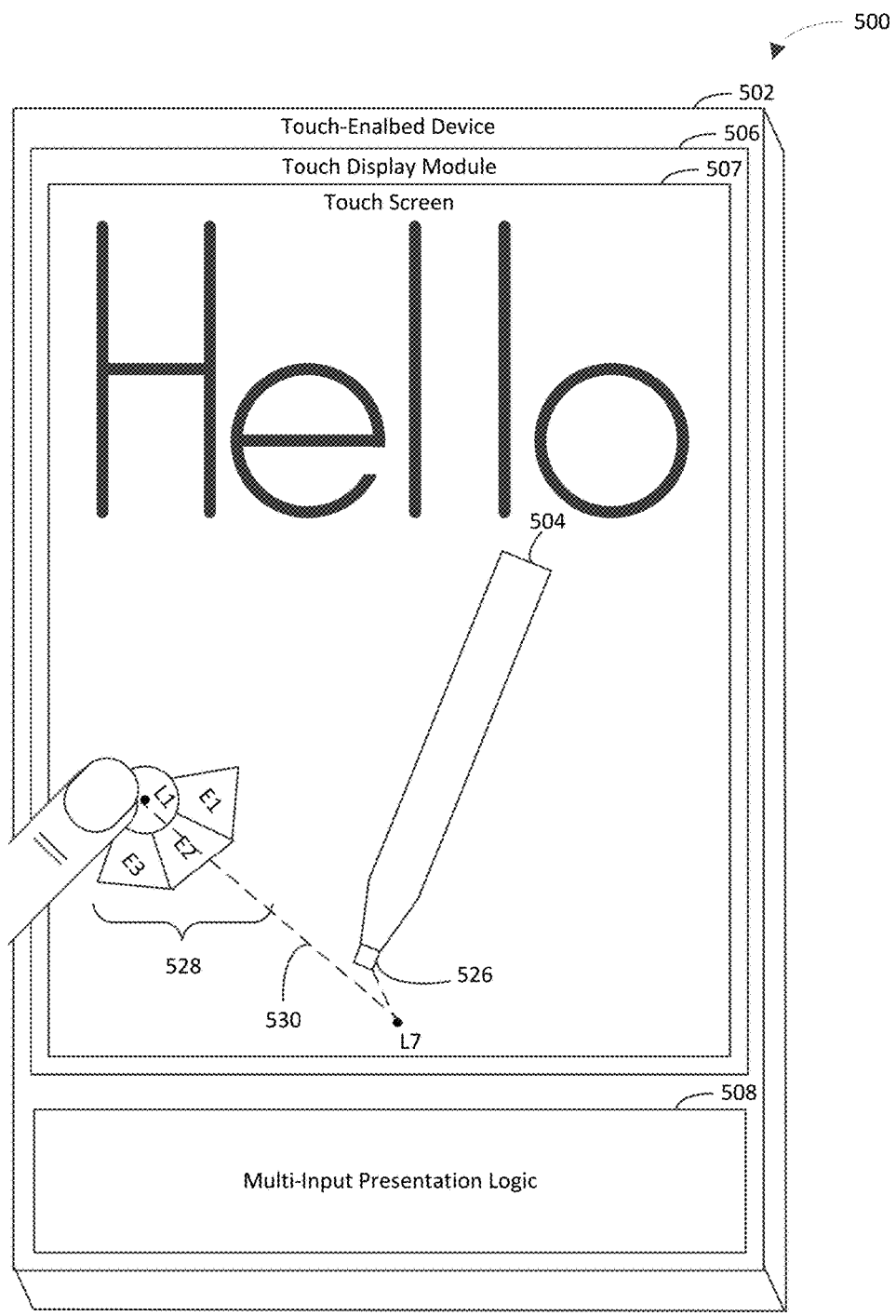
Figure 6:
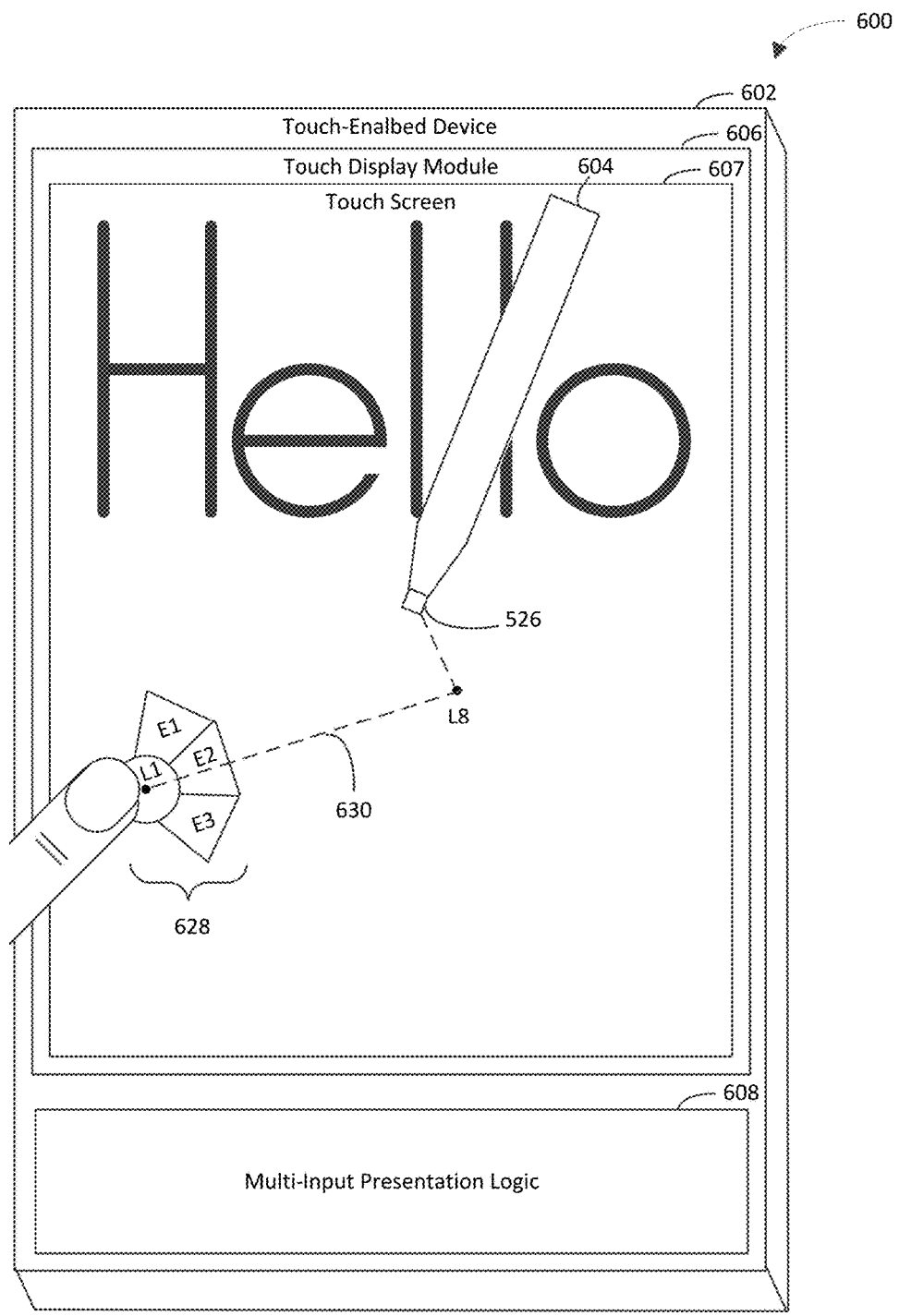
Figure 7:
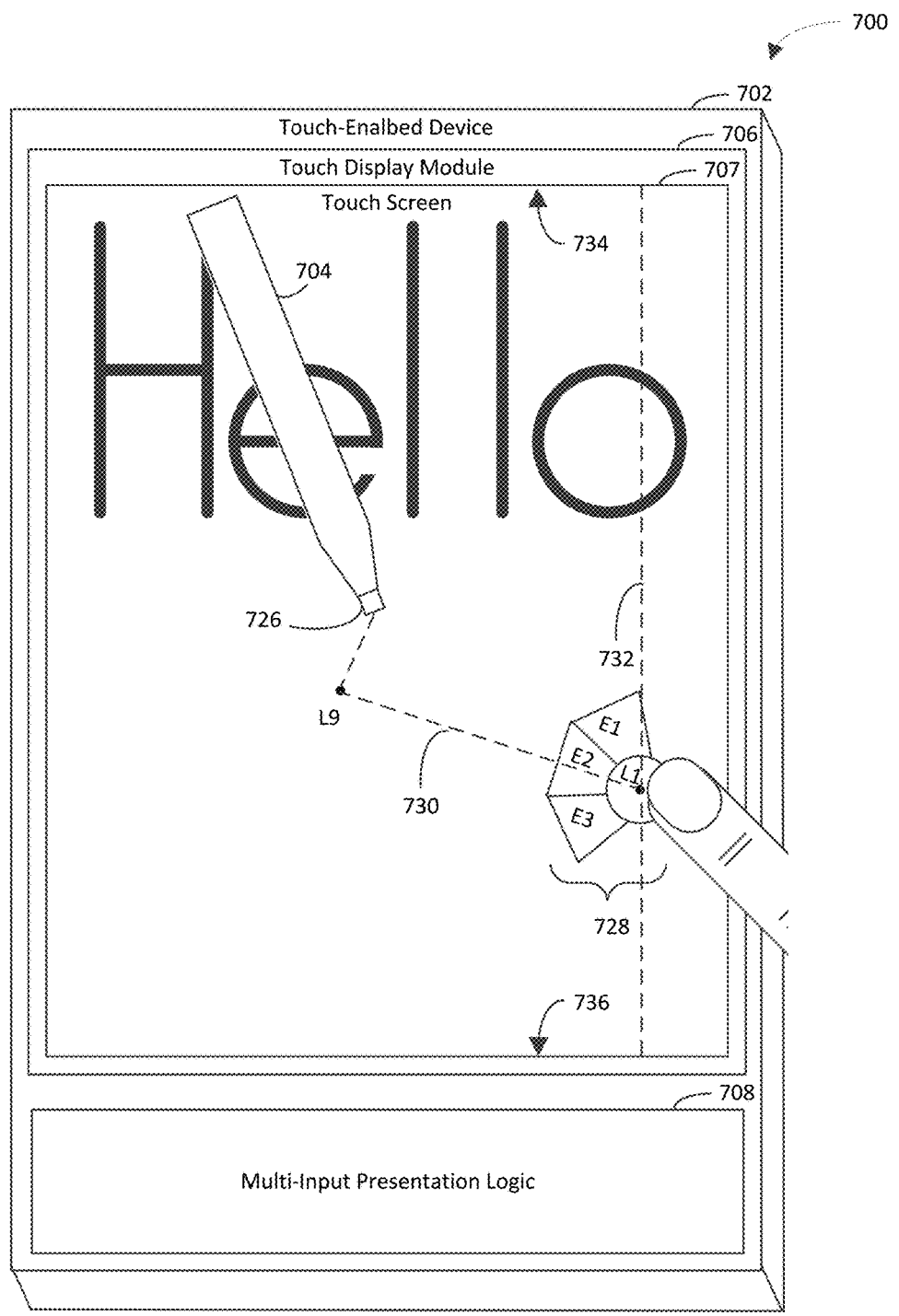

In some example embodiments, the control interface 128 shown in FIG. 1 is configured to rotate about the first location, L1, based on a position of the pointing device 104 with reference to the touch display module 106. For instance, in an example rotating embodiment, the control interface 128 rotates so that the control interface 128 (e.g., a midpoint of the control interface 128) is positioned along an axis that extends between the first location, L1, and a location on the touch screen 107 that corresponds to the pointing device 104 (e.g., the electrode 126 of the pointing device 104). FIGS. 5-7, which are discussed in further detail below, show example implementations of this rotating embodiment.

It will be recognized that the system 100 may not include one or more of the touch display module 106, the touch screen 107, the processor(s) 112, the memory 114, the transmit circuit 116, the receive circuit 118, the transmit circuit 120, the receive circuit 122, and/or the processor(s) 124. Furthermore, the system 100 may include components in addition to or in lieu of the touch display module 106, the touch screen 107, the processor(s) 112, the memory 114, the transmit circuit 116, the receive circuit 118, the transmit circuit 120, the receive circuit 122, and/or the processor(s) 124.

The touch screen 107 is shown in FIG. 1 to be in a standard viewing orientation. The phrase "standard viewing orientation" is mentioned with regard to some example embodiments discussed herein. The standard viewing orientation of a touch screen is the orientation of the touch screen for which information (e.g., content) is configured to be viewed by a user of the touch-enabled device that includes the touch screen. For instance, the writing 100 in FIG. 1 is shown to be configured such that the writing 100 is readable from left to right on the touch screen 107, which is the configuration in which English words traditionally are read. Accordingly, it will be recognized that the touch screen 107 is in the standard viewing orientation.

FIG. 2 is a block diagram of an example system 200, which is an example implementation of a system 100 shown in FIG. 1, in accordance with an embodiment. The system 200 includes the touch-enabled device 202 and the pointing device 204. The touch-enabled device 202 includes a touch display module 206 and multi-input presentation logic 208. The touch display module 206 includes a touch screen 207. The touch display module 206, the touch screen 207, and the multi-input presentation logic 208 are operable in a manner similar to the touch display module 106, the touch screen 107, and the multi-input presentation logic 108 shown in FIG. 1.

FIG. 2 illustrates a first example implementation of the writing embodiment mentioned above with reference to FIG. 1 in which the interface element E1 is selected. As shown in FIG. 2, the interface element E1 is selected by placing the pointing device 204 proximate the interface element E1. The pointing device 204 (e.g., the electrode 226 of the pointing device 204) is shown to correspond to a third location, L3, on the touch display module 206. For instance, the interface element E1 may be selected by moving the pointing device 204 (e.g., the electrode 226 of the pointing device 204) to correspond to the third location, L3. The third location, L3, is shown in FIG. 2 to overlap the interface element E1 for illustrative purposes and is not intended to be limiting. It will be recognized that the location on the touch screen 207 that corresponds to the pointing device 204 need not necessarily overlap the interface element E1 in order for the interface element E1 to be selected. For instance, the interface element E1 may be selected based on the location on the touch screen 207 that corresponds to the pointing device 204 being within a designated proximity to the interface element E1; based on the location on the touch screen 207 that corresponds to the pointing device 204 being closer to the interface element E1 than to the other interface elements E2 and E3; based on one or more other criteria; or based any combination thereof.

As shown in FIG. 2, selection of the interface element E1 causes a line thickness menu 232 to be presented on the touch screen 207. For instance, the touch display module 206 may present the line thickness menu 232 on the touch screen 207 in response to (e.g., based on) a determination that the pointing device 204 is placed proximate the interface element E1. The line thickness menu 232 includes interface elements 234a-234d. The interface elements 234a-234d correspond to respective line thicknesses that may be selected for the writing that the touch display module 206 is configured to present on the touch screen 207. For instance, interface element 234a corresponds to a first line thickness. Interface element 234b corresponds to a second line thickness that is greater than the first line thickness. Interface element 234c corresponds to a third line thickness that is greater than the second line thickness. Interface element 234d corresponds to a fourth line thickness that is greater than the third line thickness.

In the implementation of FIG. 2, the interface elements 234a-234d are configured to be selectable. For instance, each of the interface elements 234a-234d may be selected by placing the pointing device 204 (e.g., the electrode 226 of the pointing device 204) proximate the respective interface element. In one example, an interface element may be selected by physically touching the electrode 226 of the pointing device 204 to a location on the touch display module 206 that corresponds to the interface element. In another example, an interface element may be selected by hovering the electrode 226 of the pointing device 204 over a location on the touch display module 206 that corresponds to the interface element. The line thickness menu 232 is shown in FIG. 2 to include four interface elements 234a-234d for illustrative purposes and is not intended to be limiting. It will be recognized that the line thickness menu 232 may include any suitable number of interface elements (e.g., 1, 2, 3, or 4).

FIG. 3 is a block diagram of an example system 300, which is another example implementation of a system 100 shown in FIG. 1, in accordance with an embodiment. The system 300 includes components 302, 304, and 306-308, which are operable in a manner similar to components 102, 104, and 106-108 shown in FIG. 1.

FIG. 3 illustrates a second example implementation of the writing embodiment mentioned above with reference to FIG. 1 in which the interface element E2 is selected. As shown in FIG. 3, the interface element E2 is selected by placing the pointing device 304 proximate the interface element E2. The pointing device 304 (e.g., the electrode 326 of the pointing device 304) is shown to correspond to a fourth location, L4, on the touch display module 306. For instance, the interface element E2 may be selected by moving the pointing device 304 (e.g., the electrode 326 of the pointing device 304) to correspond to the fourth location, L4. The fourth location, L4, is shown in FIG. 3 to overlap the interface element E2 for illustrative purposes and is not intended to be limiting.

As shown in FIG. 3, selection of the interface element E2 causes a color menu 336 to be presented on the touch screen 307. For instance, the touch display module 306 may present the color menu 336 on the touch screen 307 in response to (e.g., based on) a determination that the pointing device 304 is placed proximate the interface element E2. The color menu 336 includes interface elements 338a-338h. The interface elements 338a-338h correspond to respective colors that may be selected for the writing that the touch display module 306 is configured to present on the touch screen 307. For instance, interface element 338a corresponds to a first color C1; interface element 338b corresponds to a second color C2 that is different from the first color C1; interface element 338c corresponds to a third color C3 that is different from the first color C1 and the second color C2, and so on. Each of the interface elements 338a-338h may be selected by placing the pointing device 304 (e.g., the electrode 326 of the pointing device 304) proximate the respective interface element. The color menu 336 is shown in FIG. 3 to include eight interface elements 338a-338h for illustrative purposes and is not intended to be limiting. It will be recognized that the color menu 336 may include any suitable number of interface elements (e.g., 1, 2, 3, or 4).

FIG. 4 is a block diagram of an example system 400, which is another example implementation of a system 100 shown in FIG. 1, in accordance with an embodiment. The system 400 includes components 402, 404, and 406-408, which are operable in a manner similar to components 102, 104, and 106-108 shown in FIG. 1.

FIG. 4 illustrates a third example implementation of the writing embodiment mentioned above with reference to FIG. 1 in which the interface element E3 is selected. As shown in FIG. 4, the interface element E3 is selected by placing the pointing device 404 proximate the interface element E3. The pointing device 404 (e.g., the electrode 426 of the pointing device 404) is shown to correspond to a fifth location, L5, on the touch display module 406. For instance, the interface element E3 may be selected by moving the pointing device 404 (e.g., the electrode 426 of the pointing device 404) to correspond to the fifth location, L5. The fifth location, L5, is shown in FIG. 4 to overlap the interface element E3 for illustrative purposes and is not intended to be limiting.

As shown in FIG. 4, selection of the interface element E3 causes an opacity menu 440 to be presented on the touch screen 407. For instance, the touch display module 406 may present the opacity menu 440 on the touch screen 407 in response to (e.g., based on) a determination that the pointing device 404 is placed proximate the interface element E3. The opacity menu 440 includes an opacity gradient 442 that includes a plurality of opacity levels. Any of the opacity levels may be selected for the writing that the touch display module 406 is configured to present on the touch screen 407 by placing the pointing device 404 (e.g., the electrode 426 of the pointing device 404) proximate the respective opacity level in the opacity gradient 442.

FIG. 5 is a block diagram of an example system 500, which is another example implementation of a system 100 shown in FIG. 1, in accordance with an embodiment. The system 500 includes components 502, 504, and 506-508, which are operable in a manner similar to components 102, 104, and 106-108 shown in FIG. 1.

FIG. 5 illustrates a first example implementation of the rotating embodiment mentioned above with reference to FIG. 1 in which the pointing device 504 (e.g., the electrode 526 of the pointing device 504) corresponds to a seventh location, L7, on the touch screen 507. As shown in FIG. 5, the multi-input presentation logic 508 causes the control interface 528 (e.g., a midpoint of the control interface 528) to be positioned along an axis 530 that extends between the first location, L1, and the seventh location, L7. For instance, the multi-input presentation logic 508 may rotate the control interface 528 about the first location, L1, so that the control interface 528 becomes positioned along the axis 530.

FIG. 6 is a block diagram of an example system 600, which is another example implementation of a system 100 shown in FIG. 1, in accordance with an embodiment. The system 600 includes components 602, 604, and 606-608, which are operable in a manner similar to components 102, 104, and 106-108 shown in FIG. 1.

FIG. 6 illustrates a second example implementation of the rotating embodiment mentioned above with reference to FIG. 1 in which the pointing device 604 (e.g., the electrode 626 of the pointing device 604) corresponds to an eighth location, L8, on the touch screen 607. As shown in FIG. 6, the multi-input presentation logic 608 causes the control interface 628 to be positioned along an axis 630 that extends between the first location, L1, and the eighth location, L8. In an aspect of this implementation, the multi-input presentation logic 608 may rotate the control interface 628 counter-clockwise about the first location, L1, from a position along the axis 530 shown in FIG. 5 to a position along the axis 630 shown in FIG. 6 in response to the pointing device being moved from a position that corresponds to the seventh location, L7, to a position that corresponds to the eighth location, L8.

FIG. 7 is a block diagram of an example system 700, which is another example implementation of a system 100 shown in FIG. 1, in accordance with an embodiment. The system 700 includes components 702, 704, and 706-708, which are operable in a manner similar to components 102, 104, and 106-108 shown in FIG. 1.

FIG. 7 illustrates a third example implementation of the rotating embodiment mentioned above with reference to FIG. 1 in which the pointing device 704 (e.g., the electrode 726 of the pointing device 704) corresponds to a ninth location, L9, on the touch screen 707. As shown in FIG. 7, the multi-input presentation logic 708 causes the control interface 728 to be positioned along an axis 730 that extends between the first location, L1, and the ninth location, L9. In an aspect of this implementation, the multi-input presentation logic 708 may rotate the control interface 728 clockwise or counterclockwise about the first location, L1, from a position along the axis 630 shown in FIG. 6 to a position along the axis 730 shown in FIG. 7 in response to the pointing device being moved from the position that corresponds to the eighth location, L8, to a position that corresponds to the ninth location, L9.

In accordance with this implementation, the multi-input presentation logic 708 rotates the control interface 728 (e.g., at least a specified portion of the control interface 728) through an axis 732 that includes the first location, L1, and that extends between a top edge 734 of the touch screen 707 and a bottom edge 736 of the touch screen 707. As the control interface 728 is rotated through the axis 732, the multi-input presentation logic 708 causes the order of the interface elements E1, E2, and E3 in the control interface 728 to be reversed, as depicted in FIG. 7. Accordingly, the interface element E1 continues to be the closest of the interface elements E1, E2, and E3 to a top edge of the control interface 728 that corresponds to the top edge 734 of the touch screen 707, and the interface element E3 continues to be closest of the interface elements E1, E2, and E3 to a bottom edge of the control interface 728 that corresponds to the bottom edge 736 of the touch screen 707, regardless whether the control interface 728 (e.g., the specified portion thereof) is positioned on the right side of the axis 732 or on the left side of the axis 732.

In an aspect of this implementation, as the control interface 728 is rotated through the axis 732, the multi-input presentation logic 708 causes visual content in each of the interface elements E1, E2, and E3 in the control interface 728 to be rotated, as depicted in FIG. 7. For example, a bottom portion of the visual content, which is closer to the bottom edge 736 of the touch screen 707 than other portions of the of the visual content before the control interface 728 is rotated through the axis 732, continues to be closer to the bottom edge 736 of the touch screen 707 than the other portions of the visual content after the control interface 728 is rotated through the axis 732. In another example, a top portion of the visual content, which is closer to the top edge 734 of the touch screen 707 than other portions of the of the visual content before the control interface 728 is rotated through the axis 732, continues to be closer to the top edge 734 of the touch screen 707 than the other portions of the visual content after the control interface 728 is rotated through the axis 732. Accordingly, the visual content in the interface elements E1, E2, and E3 may be read in a conventional viewing format (e.g., from left to right for the English language) in a standard viewing orientation of the touch screen 707, regardless whether the control interface 728 (e.g., a specified portion thereof) is positioned on the right side of the axis 732 or on the left side of the axis 732.

Figure 8:
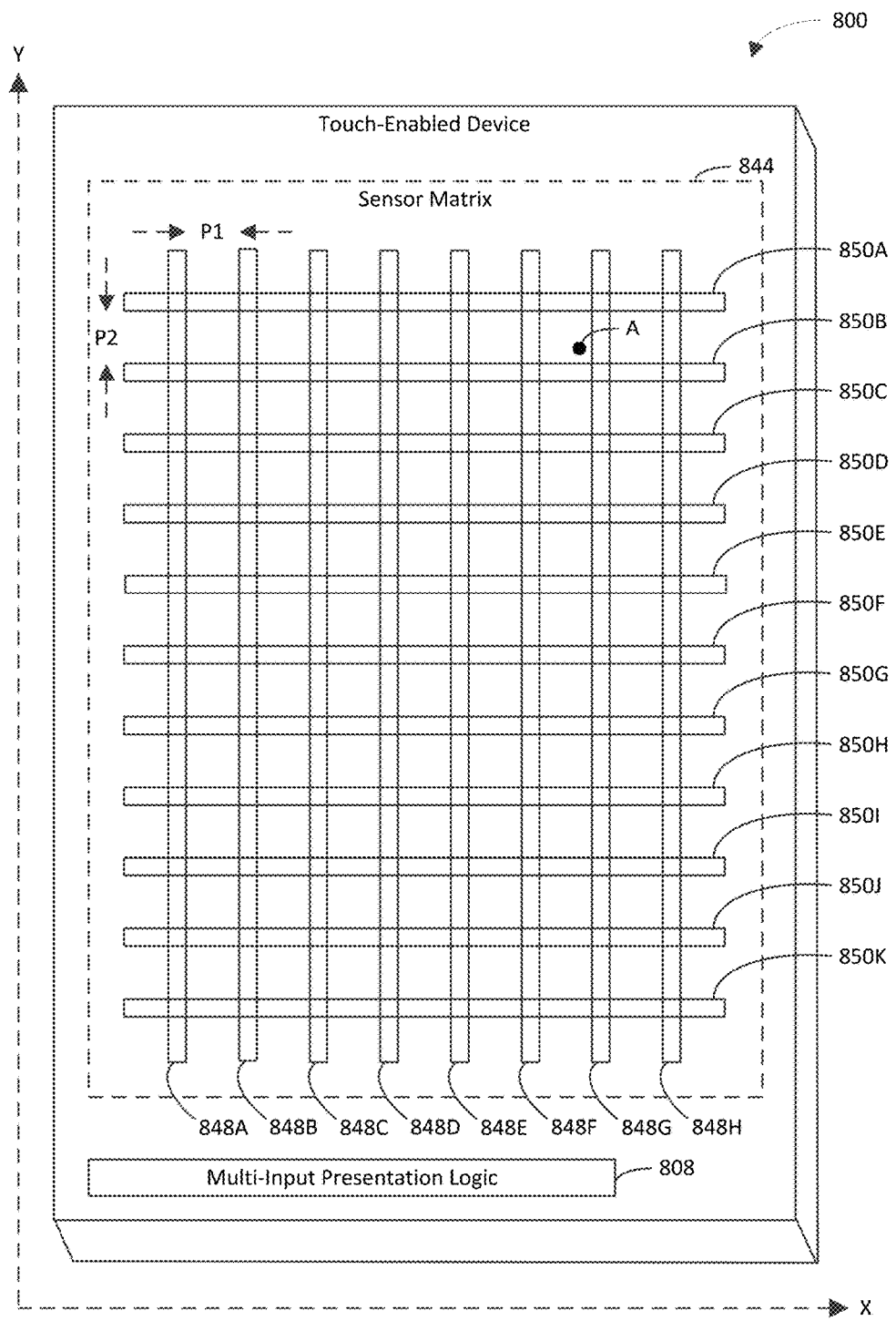

FIG. 8 is a block diagram of an example touch-enabled device 800 in accordance with an embodiment. The touch-enabled device 800 includes a sensor matrix 844 and multi-input presentation logic 808. The sensor matrix 844 includes a plurality of column electrodes 848A-848H and a plurality of row electrodes 850A-850K. The plurality of column electrodes 848A-848H are arranged to be substantially parallel with a Y-axis, as shown in FIG. 8. The plurality of row electrodes 850A-850K are arranged to be substantially parallel with an X-axis. The plurality of column electrodes 848A-848H are arranged to be substantially perpendicular to the plurality of row electrodes 850A-850K. A first pitch, P1, between adjacent column electrodes 848A-848H indicates a distance between the midpoints of the adjacent column electrodes 848A-848H. A second pitch, P2, between adjacent row electrodes 850A-850K indicates a distance between the midpoints of the adjacent row electrodes 850A-850K. The first pitch, P1, and the second pitch, P2, may be any suitable values. The first pitch, P1, and the second pitch, P2, may be the same or have different values. For instance, the first pitch, P1, and/or the second pitch, P2, may be approximately 2 mm, 3 mm, 4 mm, or 5 mm.

Placement of an object (e.g., the finger 130 or the pointing device 104) proximate a subset (e.g., one or more) of the column electrodes 848A-848H and a subset (e.g., one or more) of the row electrodes 850A-850K causes a change of capacitance to occur between the object and the electrodes in those subsets. For instance, such placement of the object may cause the capacitance to increase from a non-measurable quantity to a measurable quantity. The change of capacitance between the object and each electrode in the subsets may be used to generate a "capacitance map," which may correlate to a shape of the object. For instance, a relatively greater capacitance change may indicate that a distance between the object and the corresponding electrode is relatively small. A relatively lesser capacitance change may indicate that a distance between the object and the corresponding electrode is relatively large. Accordingly, a capacitance map, which indicates capacitance changes associated with respective electrodes in the subsets, may indicate the shape of the object. For instance, the multi-input presentation logic 808 may use the shape of the object that is indicated by the capacitance map to distinguish between various types of objects (e.g., the finger 130 and the pointing device 104).

In an example embodiment, placement of an object proximate the sensor matrix 844 at point A causes a first capacitance between the object and the row electrode 850C to change, a second capacitance between the object and the row electrode 850D to change, a third capacitance between the object and the column electrode 848D to change, and a fourth capacitance between the object and the column electrode 848E to change. It will be recognized that capacitances between the object and other respective electrodes may change, as well. For instance, the capacitances between the object and those other respective electrodes may change so long as the object is within a designated proximity (3 mm, 5 mm, 7 mm, 10 mm, etc.) to those other electrodes. However, such changes would be less than the changes to the first, second, third, and fourth capacitances mentioned above due to the greater proximity of the object to those other electrodes. Accordingly, the discussion will focus on the first, second, third, and fourth capacitances mentioned above for ease of understanding, though it will be recognized that capacitances between the object and the other respective electrodes may be taken into consideration in practice.

The multi-input presentation logic 808 is configured to determine a location of an object that is placed proximate the sensor matrix 844 based on capacitance changes that are sensed by the plurality of column electrodes 848A-848H and the plurality of row electrodes 850A-850K or respective subsets thereof. Accordingly, in the example embodiment mentioned above, the multi-input presentation logic 808 determines (e.g., estimates) the location, A, of the object based on the changes to the first, second, third, and fourth capacitances sensed at respective electrodes 850C, 850D, 848D, and 848E. For instance, the multi-input presentation logic 808 may estimate (X,Y) coordinates of the location, A.

It will be recognized that the estimated coordinates of the location, A, may correspond to a centroid or a center of mass of the object.

Determining the location, A, of the object with an accuracy on the order of the first pitch, L1, and/or the second pitch, L2, is relatively straightforward. For instance, a location of a column electrode at which a greatest capacitance change is sensed with respect to the object may indicate (e.g., provide an estimate of) an X coordinate of the location, A. A location of a row electrode at which a greatest capacitance change is sensed with respect to the object may indicate (e.g., provide an estimate of) a Y coordinate of the location, A.

One way to increase the accuracy of the estimate that is determined by the multi-input presentation logic 808 is to decrease the first pitch, L1, between adjacent column electrodes 848A-848H and/or the second pitch, L2, between adjacent row electrodes 850A-850K. Another way to increase the accuracy is to interpolate (e.g., as a continuous function) the capacitance changes that are sensed by the plurality of column electrodes 848A-848H and the plurality of row electrodes 850A-850K or respective subsets thereof. For instance, in accordance with the example embodiment mentioned above, the multi-input presentation logic 808 interpolates the changes to the first, second, third, and fourth capacitances to determine the location, A.

Multi-input presentation logic 108, 208, 308, 408, 508, 608, 708, and/or 808 may be implemented in various ways to cause a control interface to be presented based on a multi-input command, including being implemented in hardware, software, firmware, or any combination thereof. For example, multi-input presentation logic 108, 208, 308, 408, 508, 608, 708, and/or 808 may be implemented as computer program code configured to be executed in one or more processors. For instance, a portion or all of multi-input presentation logic 108, 208, 308, 408, 508, 608, 708, and/or 808 may be incorporated into an application or a platform (e.g., operating system). In another example, multi-input presentation logic 108, 208, 308, 408, 508, 608, 708, and/or 808 may be implemented as hardware logic/electrical circuitry. For instance, multi-input presentation logic 108, 208, 308, 408, 508, 608, 708, and/or 808 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

FIGS. 9-13 depict flowcharts 900, 1000, 1100, 1200, and 1300 of example methods for presenting a control interface based on a multi-input command in accordance with embodiments. Flowcharts 900, 1000, 1100, 1200, and 1300 may be performed by any of touch-enabled devices 100, 200, 300, 400, 500, 600, 700, and/or 800 shown in respective FIGS. 1-8, for example. For illustrative purposes, flowcharts 900, 1000, 1100, 1200, and 1300 are described with respect to a touch-enabled device 1400 shown in FIG. 14. As shown in FIG. 14, touch-enabled device 1400 includes a touch display module 1406 and multi-input presentation logic 1408. The touch display module 1406 includes a touch screen 1407 and sensors 1410. The multi-input presentation device 1408 includes detection logic 1412, causation logic 1414, determination logic 1416, and interface logic 1418. The interface logic 1418 includes size logic 1420, text logic 1422, fold logic 1424, flip logic 1426, opacity logic 1428, rotation logic 1430, and arrangement logic 1432. Further structural and operational embodiments will be apparent to persons skilled in the relevant art(s) based on the discussion regarding flowcharts 900, 1000, 1100, 1200, and 1300.

Figure 9:
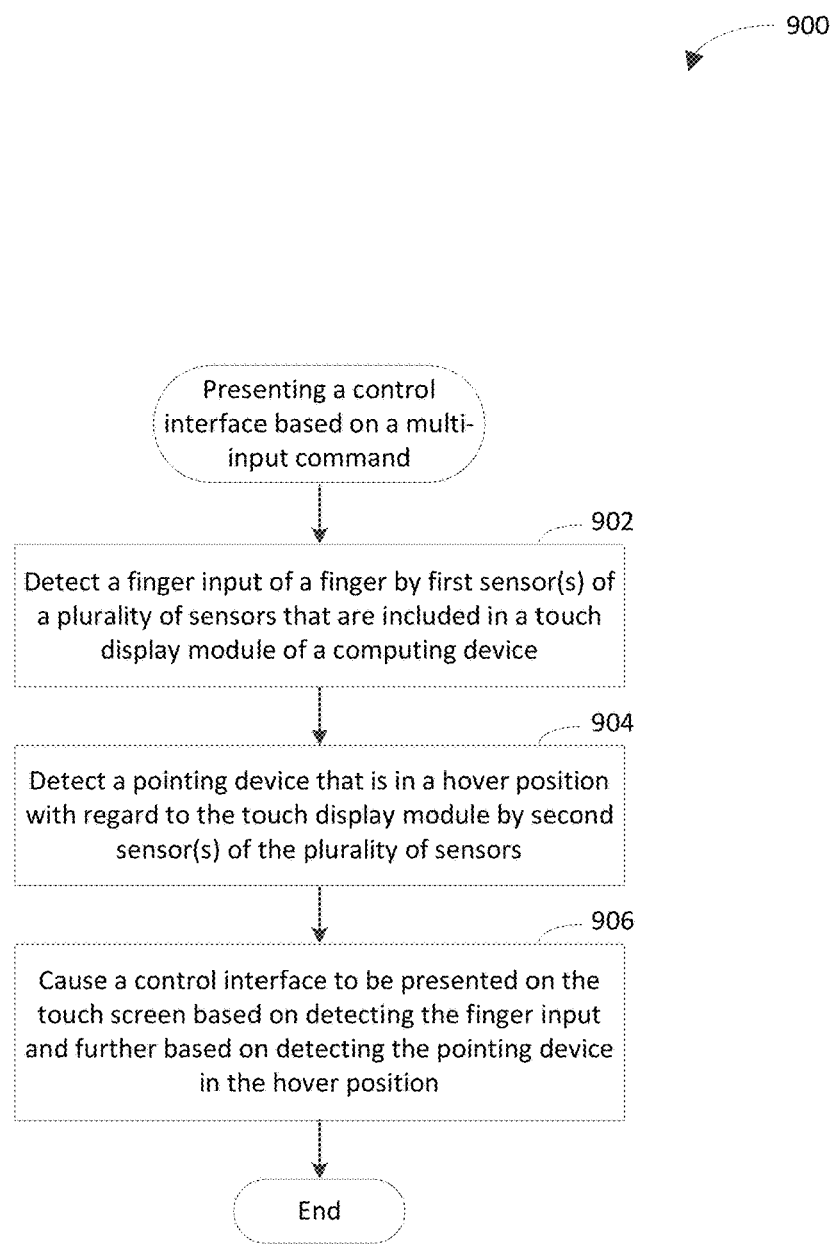
FIGS. 9-13 depict flowcharts of example methods for presenting a control interface based on a multi-input command in accordance with embodiments.

As shown in FIG. 9, the method of flowchart 900 begins at step 902. In step 902, a finger input of a finger is detected by first sensor(s) of a plurality of sensors that are included in a touch display module of a computing device. For instance, the plurality of sensors may be a matrix of sensors. It will be recognized that the finger input may be a first input of the multi-input command on which presentation of the control interface is based. In one example, the finger input may be a touch input. In accordance with this example, the touch input may be a touch and hold input, a single tap input, a double tap input, etc. In another example, the finger input may be a hover input. In accordance with this example, the hover input may be defined to be within five millimeters (mm) from the touch display module, within ten mm from the touch display module, etc.

In an example implementation, the sensors 1410 detect inputs 1434. The sensors 1410 provide the inputs 1434 or representations thereof to the detection logic 1412. Accordingly, it may be said that the detection logic 1412 detects the inputs 1434 using the sensors 1434. The inputs 1434 include finger input(s) 1402 and pointing device (PD) input(s) 1404. In accordance with this implementation, the first sensor(s) are included in the sensors 1410, and the finger input that is detected by the first sensor(s) is included in the finger input(s) 1402. In further accordance with this implementation, the first sensor(s) may detect the finger input as a result of the finger 130 being placed proximate the first sensor(s). Upon receipt of the finger input (or a representation thereof) from the first sensor(s), the detection logic 1412 may provide a first detection indicator, which is included among the detection indicator(s) 1436, to indicate that the finger input has been detected.

At step 904, a pointing device that is in a hover position with regard to the touch display module is detected by second sensor(s) of the plurality of sensors. For instance, the pointing device may be detected in the hover position in response to detecting the finger input of the finger at step 902. It will be recognized that the pointing device being placed in the hover position may constitute a hover input, which serves as a second input of the multi-input command on which presentation of the control interface is based. The hover position is characterized by the pointing device being a spaced distance from the touch display module. Detecting the pointing device in the hover position may include detecting that a hover position is initiated with the pointing device, though the scope of the example embodiments is not limited in this respect. In one example, the pointing device may be an electrostatic pointing device. In another example, the pointing device may be a passive slug (e.g., an electrostatically conductive passive slug or a magnetically conductive passive slug). Any one or more of the second sensor(s) may be same as or different from any one or more of the first sensor(s).

In an example implementation, the second sensor(s) are included in the sensors 1410. In accordance with this implementation, the pointing device 104 being in the hover position constitutes a pointing device (PD) input, and the second sensor(s) detect the PD input. In further accordance with this implementation, the PD input that is detected by the second sensor(s) is included in the PD input(s) 1404. In further accordance with this implementation, the second sensor(s) may detect the PD input as a result of the pointing device 104 being placed proximate the second sensor(s). Upon receipt of the PD input (or a representation thereof) from the second sensor(s), the detection logic 1412 may provide a second detection indicator, which is included among the detection indicator(s) 1436, to indicate that the PD input has been detected.

At step 906, a control interface is caused to be presented on the touch screen based on detecting the finger input and further based on detecting the pointing device in the hover position. For instance, causing the control interface to be presented on the touch screen may include initiating presentation of the control interface on the touch screen, though the scope of the example embodiments is not limited in this respect.

In an example implementation, the causation logic 1414 and/or the interface logic 1408 causes the control interface 1454 to be presented on the touch screen 1407 based on the finger input being detected and further based on the PD input being detected. For example, the causation logic 1414 may provide an interface instruction 1452 to the interface logic 1418 in response to receipt of the detection indicator(s) 1436. In accordance with this example, the causation logic 1414 may review the detection indicator(s) 1436 to determine whether the detection indicator(s) include the first indicator and the second indicator. In further accordance with this example, the causation logic 1414 may provide the interface instruction 1452 to the interface logic 1418 in response to determining that the detection indicator(s) 1436 include the first indicator and the second indicator. The interface instruction 1452 instructs the interface logic 1418 to form the control interface 1454. The interface instruction 1452 may specify attribute(s) that the control interface 1454 is to have, though the scope of the example embodiments is not limited in this respect. In further accordance with this implementation, the interface logic 1418 forms the control interface 1454 in accordance with the interface instruction 1452. The interface logic 1418 provides the control interface 1454 to the touch display module 1406 for presentation on the touch screen 1407.

In an example embodiment, the finger input that is detected at step 902 is a touch input. In accordance with this embodiment, the pointing device may be detected in the hover position at step 904 while the finger is in contact with the touch display module.

In another example embodiment, the first sensor(s) are associated with a specified location on the touch screen. In accordance with this embodiment, detecting the pointing device in the hover position at step 904 includes detecting movement of the pointing device toward the specified location while the pointing device is a spaced distance from the touch display module. For instance, multiple PD measurements corresponding to respective instances of time may be compared to determine whether the pointing device is moving toward the specified location. In further accordance with this embodiment, the control interface is caused to be presented on the touch screen at step 906 based on detecting the finger input and further based on detecting the movement of the pointing device toward the specified location while the pointing device is a spaced distance from the touch display module.

In an aspect of this embodiment, detecting the pointing device in the hover position at step 904 includes detecting the movement of the pointing device toward the specified location at a rate (e.g., speed or velocity) that exceeds a rate threshold. In accordance with this aspect, the control interface is caused to be presented on the touch screen at step 906 further based on the rate exceeding the rate threshold.

In yet another example embodiment, the first sensor(s) are associated with a first location on the touch screen. In accordance with this embodiment, the second sensor(s) are associated with a second location on the touch screen. In further accordance with this embodiment, the control interface is caused to be presented on the touch screen at step 906 further based on a distance between the first location and the second location being less than or equal to a threshold distance. For instance, the threshold distance may be approximately 6 mm, 8 mm, 10 mm, or 12 mm. In an example implementation, the inputs 1434 include information regarding the finger input that is detected by the first sensor(s) and the PD input that is detected by the second sensor(s). In accordance with this implementation, the detection logic 1412 analyzes the information regarding the finger input and the PD input to determine the first location and the second location, respectively. In further accordance with this implementation, the detection logic 1412 compares the first location and the second location to determine the distance between the first location and the second location. In further accordance with this implementation, the detection logic 1412 compares the distance to the threshold distance to determine whether the distance is less than or equal to the threshold distance. In an example, the detection logic 1412 may provide a third detection indicator, which is included among the detection indicator(s) 1436, to indicate that the distance is less than or equal to the threshold distance. In accordance with this example, the causation logic 1414 may review the detection indicator(s) 1436 to determine whether the detection indicator(s) include the first, second, and third indicators. In further accordance with this example, the causation logic 1414 may provide the interface instruction 1452 to the interface logic 1418 in response to determining that the detection indicator(s) 1436 include the first, second, and third indicators.

In still another example embodiment, the first sensor(s) are associated with a specified location on the touch screen. In accordance with this embodiment, causing the control interface to be presented on the touch screen at step 906 includes causing the control interface to be presented at an interface location on the touch screen that is based on the specified location. In one example, the interface location and the specified location are same. In another example, the interface location and the specified location are different. In accordance with this example, the interface location may be a predetermined offset from the specified location. For instance, the predetermined offset may be determined at a first time instance that precedes a second time instance at which the finger input is detected by the first sensor(s).

In some example embodiments, one or more steps 902, 904, and/or 906 of flowchart 900 may not be performed. Moreover, steps in addition to or in lieu of steps 902, 904, and/or 906 may be performed. For instance, in an example embodiment, the first sensor(s) are associated with a specified location on the touch screen. In accordance with this embodiment, the method of flowchart 900 includes determining that the pointing device is moving toward the specified location (e.g., while the pointing device is a spaced distance from the touch display module). For example, the determination logic 1416 may determine whether the pointing device 104 is moving toward the specified location. In accordance with this example, the determination logic 1416 may compare multiple PD inputs associated with the pointing device 104 that correspond to respective instances in time to determine whether the pointing device 104 is moving toward the specified location. In further accordance with this example, the determination logic 1416 may generate a size instruction 1438 in response to determining that the pointing device 104 is moving toward the specified location. The size instruction 1438 may indicate that the size of the control interface 1454 is to be increased. In further accordance with this embodiment, the method of flowchart 900 further includes increasing a size of the control interface as the pointing device is moving toward the specified location. For example, the size logic 1420 may increase the size of the control interface 1454 as the pointing device 104 is moving toward the specified location. In accordance with this example, the size logic 1420 may increase the size of the control interface 1454 in response to receiving the size instruction 1438.

In an aspect of this embodiment, the method of flowchart 900 includes determining that the pointing device is moving away from the specified location (e.g., while the pointing device is a spaced distance from the touch display module). For example, the determination logic 1416 may determine that the pointing device 104 is moving away from the specified location. In accordance with this example, the determination logic 1416 may generate a size instruction 1438 in response to determining that the pointing device 104 is moving away from the specified location. The size instruction 1438 may indicate that the size of the control interface 1454 is to be decreased. In accordance with this aspect, the method of flowchart 900 further includes decreasing the size of the control interface as the pointing device is moving away from the specified location. For example, the size logic 1420 may decrease the size of the control interface 1454 as the pointing device 104 is moving away from the specified location. In accordance with this example, the size logic 1420 may decrease the size of the control interface 1454 in response to receiving the size instruction 1438.

In another aspect of this embodiment, the pointing device moves from a first location that corresponds to a first point on the touch screen to a second location that corresponds to a second point on the touch screen. The first point is a first distance from the specified location. The second point is a second distance from the specified location. The first distance is greater than the second distance. In accordance with this aspect, the control interface includes multiple interface elements at the first location that provide a first amount of information regarding at least one functionality of the touch-enabled device. In further accordance with this aspect, increasing the size of the control interface includes expanding the interface elements as the pointing device moves from the first location to the second location to provide a second amount of information regarding the at least one functionality of the touch-enabled device. The second amount of information is greater than the first amount of information.

In an example implementation of this aspect, the interface elements include a first number of respective discrete colors. In accordance with this implementation, the interface elements are expanded to provide a color wheel that includes a second number of colors that is greater than the first number of colors.

In another example embodiment, the first sensor(s) are associated with a specified location on the touch screen. In accordance with this embodiment, the control interface includes multiple interface elements. Each interface element is selectable to cause the respective action with which the interface element is associated to be performed. In further accordance with this embodiment, the method of flowchart 900 further includes determining that the pointing device moves toward the specified location (e.g., while the pointing device is a spaced distance from the touch display module). For example, the determination logic 1416 may determine that the pointing device 104 moves toward the specified location. In accordance with this example, the determination logic 1416 may generate a text instruction 1440 in response to determining that the pointing device 104 moves toward the specified location. The text instruction 1440 may indicate that the text is to be introduced proximate the interface elements. In further accordance with this embodiment, the method of flowchart 900 further includes introducing text proximate the interface elements in response to determining that the pointing device moves toward the specified location. For example, the text logic 1422 may introduce the text proximate the interface elements. In accordance with this example, the text logic 1422 may introduce the text proximate the interface elements in response to receiving the text instruction 1440. In one example, the text may be introduced in one or more of the interface elements. In another example, the text may be introduced next to the interface elements. In accordance with this example, the text may be introduced within a specified proximity (e.g., a predetermined proximity) to the interface elements. The text describes multiple actions that are associated with the respective interface elements.

In an aspect of this embodiment, the method of flowchart 900 includes determining that the pointing device moves away from the specified location (e.g., while the pointing device is a spaced distance from the touch display module). For example, the determination logic 1416 may determine that the pointing device 104 moves away from the specified location. In accordance with this example, the determination logic 1416 may generate a text instruction 1440 in response to determining that the pointing device 104 moves away from the specified location. The text instruction 1440 may indicate that the text is to be removed from the touch screen 1407. In accordance with this aspect, the method of flowchart 900 further includes removing the text from the touch screen in response to determining that the pointing device moves away from the specified location. For example, the text logic 1422 may remove the text from the touch screen 1407. In accordance with this example, the text logic 1422 may remove the text from the touch screen 1407 in response to receiving the text instruction 1440.

In yet another example embodiment, the method of flowchart 900 includes determining that multiple pointing devices are associated with respective users. The determining includes determining that the pointing device in the hover position is associated with a specified user. For instance, the determination logic 1416 may determine that the pointing devices are associated with the respective users. In accordance with this embodiment, the method of flowchart 900 further includes determining that the finger input is received from the specified user. For instance, the determination logic 1416 may determine that the finger input is received from the specified user. In further accordance with this embodiment, the control interface is caused to be presented on the touch screen at step 906 further based on determining that the pointing device in the hover position is associated with the specified user and further based on determining that the finger input is received from the specified user.

In still another example embodiment, the method of flowchart 900 includes determining that the pointing device moves toward the control interface. For example, the determination logic 1416 may determine that the pointing device 104 moves toward the control interface 1454. In accordance with this example, the determination logic 1416 may generate an opacity instruction 1446 in response to determining that the pointing device 104 moves toward the control interface 1454. The opacity instruction 1446 may indicate that the opacity of the control interface 1454 is to be increased. In accordance with this embodiment, the method of flowchart 900 further includes increasing an opacity of the control interface as the pointing device moves toward the control interface. For example, the opacity logic 1446 may increase the opacity of the control interface 1454 as the pointing device 104 moves toward the control interface 1454. In accordance with this example, the opacity logic 1446 may increase the opacity of the control interface 1454 in response to receiving the opacity instruction 1446.

In an aspect of this embodiment, detecting that the pointing device moves toward the control interface includes determining that a distance between the pointing device and the control interface is decreasing. In accordance with this aspect, the opacity of the control interface is increased as the distance is decreasing.

In another aspect of this embodiment, the method of flowchart 900 further includes detecting that the pointing device moves away from the control interface. For example, the determination logic 1416 may determine that the pointing device 104 moves away from the control interface 1454. In accordance with this example, the determination logic 1416 may generate an opacity instruction 1446 in response to determining that the pointing device 104 moves away from the control interface 1454. The opacity instruction 1446 may indicate that the opacity of the control interface 1454 is to be decreased. In accordance with this aspect, the method of flowchart 900 further includes decreasing the opacity of the control interface as the pointing device moves away from the control interface. For example, the opacity logic 1446 may decrease the opacity of the control interface 1454 as the pointing device 104 moves away from the control interface 1454. In accordance with this example, the opacity logic 1446 may decrease the opacity of the control interface 1454 in response to receiving the opacity instruction 1446.

In an example implementation of this aspect, detecting that the pointing device moves away from the control interface includes determining that the distance between the pointing device and the control interface is increasing. In accordance with this implementation, the opacity of the control interface is decreased as the distance is increasing.

In yet another aspect of this embodiment, the method of flowchart 900 further includes setting the opacity of the control interface to be a fixed opacity in response to a distance between the pointing device and the control interface being less than or equal to a threshold distance. For instance, the opacity logic 1428 may set the opacity of the control interface 1454 to be the fixed opacity.

In still another aspect of this embodiment, the first sensor(s) are associated with a specified location on the touch screen. In accordance with this aspect, the method of flowchart 900 further includes setting the opacity of the control interface to be a fixed opacity in response to a distance between the pointing device and the specified location being less than or equal to a threshold distance.

In another example embodiment, the method of flowchart 900 includes forming the control interface to include multiple interface elements. For instance, the interface logic 1418 forms the control interface 1454 to include the multiple interface elements. An interface element may be a virtual button or a widget, though the scope of the example embodiments is not limited in this respect. In accordance with this embodiment, each interface element is configured to provide a respective menu in response to selection of the respective interface element. For instance, each menu may include selectable values that correspond to a respective attribute of writing that the pointing device is configured to provide. Examples of such an attribute include but are not limited to opacity, line width, color, or real-world writing device that is emulated by the pointing device (e.g., chalk, pen, pencil, paint, or marker).

In yet another example embodiment, the method of flowchart 900 includes forming the control interface to include multiple interface elements. In accordance with this embodiment, each interface element is configured to invoke a respective command with regard to a selected item on the touch screen in response to selection of the respective interface element. For instance, the selected item may be text, an image, a hyperlink, etc. Examples of a command include but are not limited to resize, copy, cut, rotate, and crop.

In still another example embodiment, the method of flowchart 900 includes determine a frequency with which each of a plurality of commands is historically received via the control interface. For instance, the determination logic 1416 may determine the frequency with which each of the commands is historically received via the control interface 1454. In accordance with this embodiment, the method of flowchart 900 further includes forming the control interface to include multiple interface elements that correspond to the respective commands. For instance, the interface logic 1418 may form the control interface 1454 to include the multiple interface elements. In further accordance with this embodiment, forming the control interface includes arranging the interface elements in the control interface to have respective proximities to a midpoint of the control interface. The proximities are based on the respective frequencies with which the respective commands that correspond to the respective interface elements are historically received via the control interface. For example, a relatively greater frequency corresponds to a relatively closer proximity to the midpoint of the control interface. In accordance with this example, a relatively lesser frequency corresponds to a relatively farther proximity to the midpoint of the control interface.

In yet another example embodiment, the method of flowchart 900 includes determine a frequency with which each of a plurality of commands is historically received via the control interface. In accordance with this embodiment, the method of flowchart 900 further includes forming the control interface to include multiple interface elements that correspond to the respective commands. In further accordance with this embodiment, forming the control interface includes arranging the interface elements in the control interface to have respective proximities to a top edge of the touch screen based on a standard viewing orientation of the touch screen. The proximities are based on the respective frequencies with which the respective commands that correspond to the respective interface elements are historically received via the control interface. For example, a relatively greater frequency corresponds to a relatively closer proximity to the top (or the bottom) of the control interface. In accordance with this example, a relatively lesser frequency corresponds to a relatively farther proximity to the top (or the bottom) of the control interface.

Figure 10:
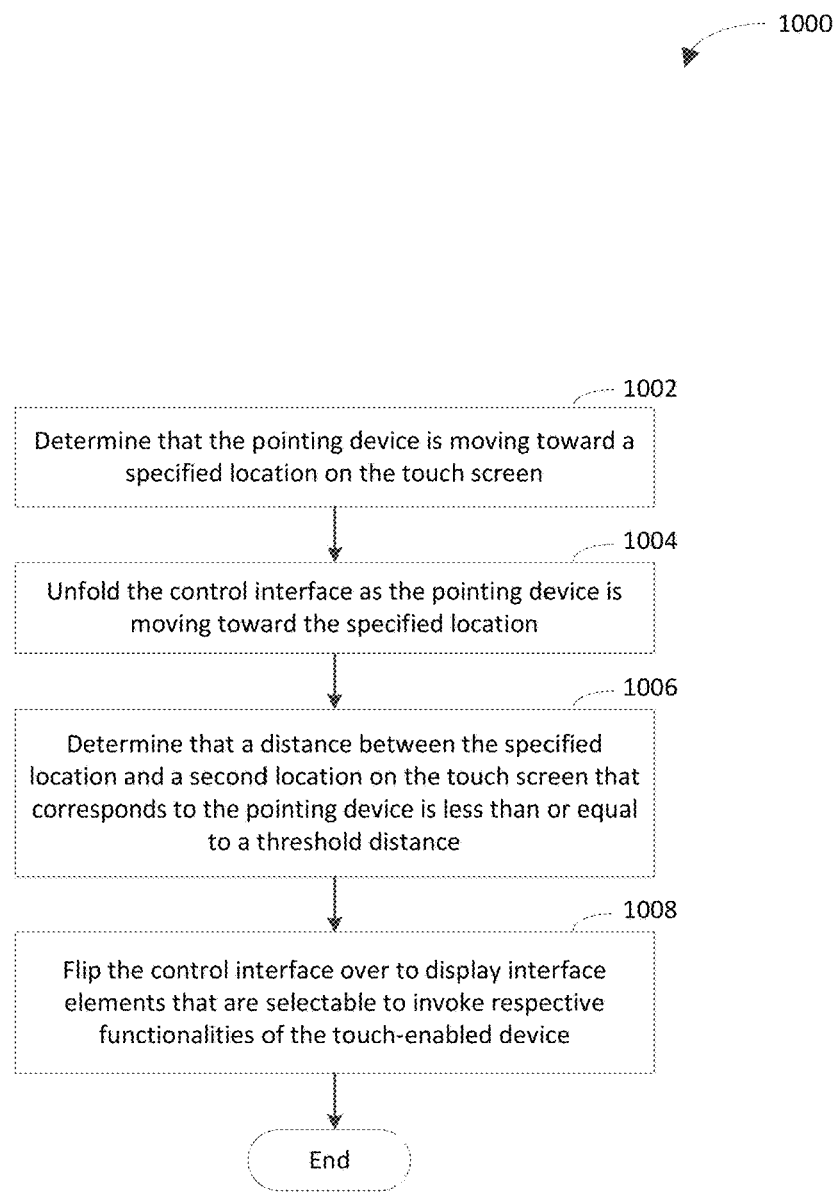

In an example embodiment, the method of flowchart 900 includes one or more of the steps shown in flowchart 1000 of FIG. 10. In accordance with this embodiment, the first sensor(s) are associated with a specified location on the touch screen.

As shown in FIG. 10, the method of flowchart 1000 begins at step 1002. In step 1002, a determination is made that the pointing device is moving toward the specified location (e.g., while the pointing device is a spaced distance from the touch display module). In an example implementation, the determination logic 1416 determines that the pointing device 104 is moving toward the specified location. In accordance with this implementation, the determination logic 1416 may generate a fold instruction 1442 in response to determining that the pointing device 104 is moving toward the specified location. The fold instruction 1442 may indicate that the control interface 1454 is to be unfolded.

At step 1004, the control interface is unfolded as the pointing device is moving toward the specified location. In an example implementation, the fold logic 1424 unfolds the control interface 1454 as the pointing device 104 is moving toward the specified location. For instance, the fold logic 1424 may unfold the control interface 1454 in response to receiving the fold instruction 1442.

At step 1006, a determination is made that a distance between the specified location and a second location on the touch screen that corresponds to the pointing device is less than or equal to a threshold distance. In an example implementation, the determination logic 1416 determines that the distance between the specified location and the second location is less than or equal to the threshold distance. In accordance with this example, the determination logic 1416 may generate a flip instruction 1444 in response to determining that the distance between the specified location and the second location is less than or equal to the threshold distance. The flip instruction 1444 may indicate that the control interface 1454 is to be flipped over.

At step 1008, the control interface is flipped over to display multiple interface elements that are selectable to invoke respective functionalities of the touch-enabled device. In an example implementation, the flip logic 1426 flips the control interface 1454 over to display the interface elements. For instance, the flip logic 1426 may flip the control interface 1454 over in response to receiving the flip instruction 1444.

In an aspect of this embodiment, flipping the control interface over at step 1008 includes flipping the control interface over to display the interface elements. In one implementation of this aspect, each interface element is configured to provide a respective menu in response to selection of the respective interface element. In another implementation of this aspect, each interface element is configured to invoke a respective command with regard to a selected item on the touch screen in response to selection of the respective interface element.

In some aspects of this embodiment, one or more steps 1002, 1004, 1006, and/or 1008 of flowchart 1000 may not be performed. Moreover, steps in addition to or in lieu of steps 1002, 1004, 1006, and/or 1008 may be performed. For instance, in an aspect of this embodiment, the method of flowchart 1000 includes determining that the pointing device is moving away from the specified location (e.g., while the pointing device is a spaced distance from the touch display module). In an example implementation, the determination logic 1416 determines that the pointing device 104 is moving away from the specified location. In accordance with this implementation, the determination logic 1416 may generate a fold instruction 1442 in response to determining that the pointing device 104 is moving away from the specified location. The fold instruction 1442 may indicate that the control interface 1454 is to be folded. In accordance with this aspect, the method of flowchart 1000 further includes folding the control interface as the pointing device is moving away from the specified location. In an example implementation, the fold logic 1424 folds the control interface 1454 as the pointing device 104 is moving away from the specified location. For instance, the fold logic 1424 may fold the control interface 1454 in response to receiving the fold instruction 1442.

In another example embodiment, the first sensor(s) are associated with a specified location on the touch screen. In accordance with this embodiment, the method of flowchart 900 includes rotating the control interface about the specified location (e.g., on-the-fly and/or in real-time) to track movement of the pointing device with reference to the specified location. For instance, the control interface may be rotated to be positioned on a path that is defined between the specified location and a second location on the touch screen that corresponds to the pointing device. In an example implementation, the rotating logic 1430 rotates the control interface 1454 about the specified location to track movement of the pointing device 104. For example, the determination logic 1416 may determine the movement of the pointing device 104. In accordance with this example, the determination logic 1416 may generate a rotation instruction 1448 in response to determining the movement of the pointing device 104. The rotating instruction 1448 may indicate an amount and/or angular direction in which the control interface 1454 is to be rotated. In further accordance with this example, the rotating logic 1430 may rotate the control interface 1454 in response to receiving the rotation instruction 1448. For instance, the rotation logic 1430 may rotate the control interface 1454 in accordance with the amount and/or the angular direction that is indicated by the rotation instruction 1448.

Figure 11:
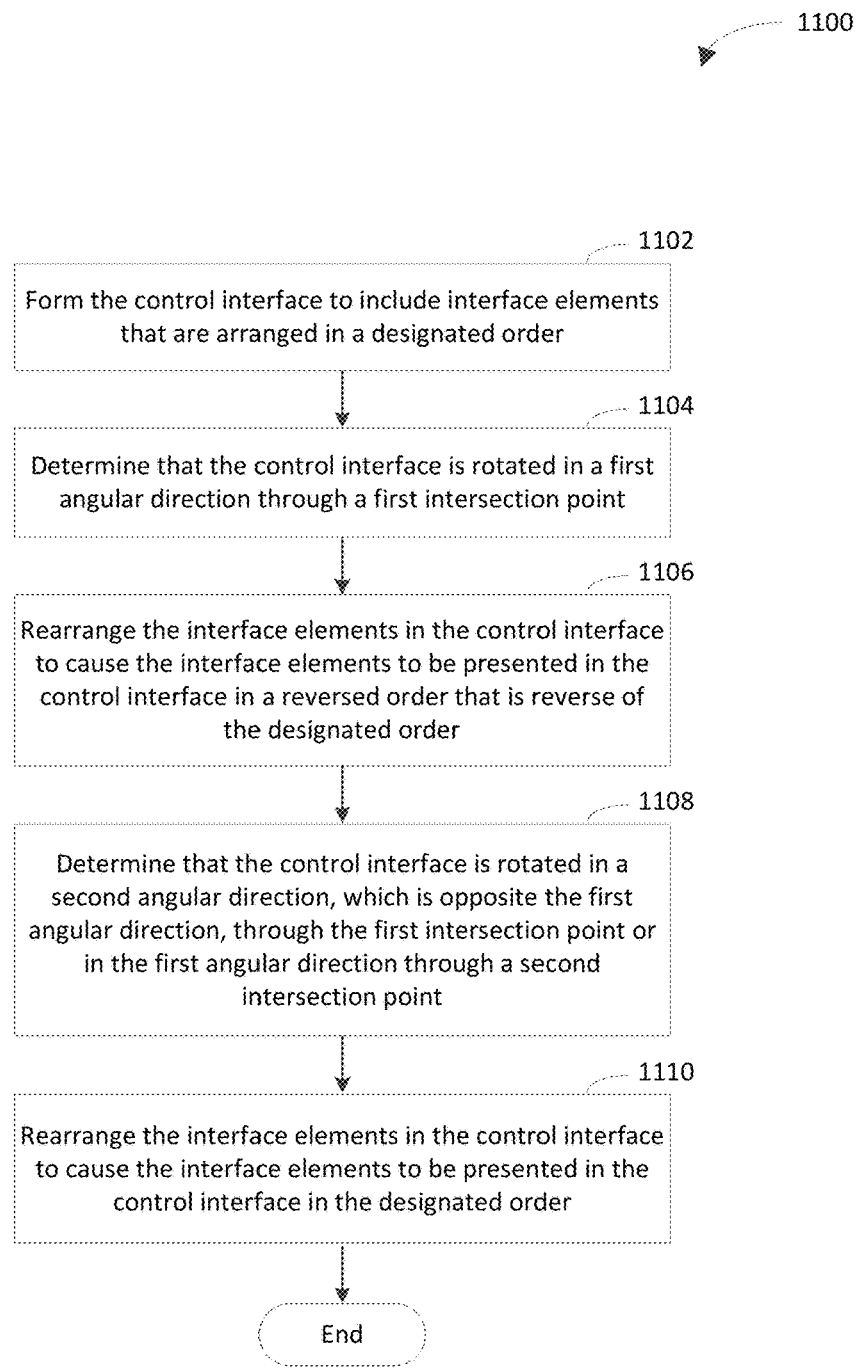

In an aspect of this embodiment, the method of flowchart 900 includes one or more of the steps shown in flowchart 1100 of FIG. 11. In accordance with this aspect, an axis that includes the specified location is defined between a top edge of the touch screen and a bottom edge of the touch screen based on a standard viewing orientation of the touch screen. In further accordance with this aspect, a path along which the control interface rotates intersects the axis at a first intersection point and a second intersection point.

As shown in FIG. 11, the method of flowchart 1100 begins at step 1102. In step 1102, the control interface is formed to include multiple interface elements that are arranged in a designated order. In an example implementation, the interface logic 1418 forms the control interface 1454 to include the interface elements.

At step 1104, a determination is made that the control interface is rotated in a first angular direction (e.g., clockwise or counterclockwise) through the first intersection point. For instance, the determination may be made at step 1104 in response to forming the control interface at step 1102. In an example implementation, the determination logic 1416 determines that the control interface 1454 is rotated in the first angular direction through the first intersection point. In accordance with this implementation, the determination logic 1416 may generate an arrangement instruction 1450 in response to determining that the control interface 1454 is rotated in the first angular direction through the first intersection point. The arrangement instruction 1450 may indicate that the interface elements are to be arranged in the control interface 1454.

At step 1106, the interface elements are rearranged in the control interface to cause the interface elements to be presented in the control interface in a reversed order that is reverse of the designated order. For instance, the interface elements may be rearranged at step 1106 in response to determining that the control interface is rotated through the first intersection point at step 1104. In an example implementation, the arrangement logic 1432 rearranges the interface elements in the control interface 1454. For instance, the arrangement logic 1432 may rearrange the interface elements in the control interface 1454 in response to receiving the arrangement instruction 1450.

At step 1108, a determination is made that the control interface is rotated in a second angular direction, which is opposite the first angular direction, through the first intersection point or in the first angular direction through the second intersection point. For instance, the determination may be made at step 1108 in response to determining that the control interface is rotated through the first intersection point at step 1104. In an example implementation, the determination logic 1416 determines that the control interface 1454 is rotated in the second angular direction through the first intersection point or in the first angular direction through the second intersection point. In accordance with this implementation, the determination logic 1416 may generate an arrangement instruction 1450 in response to determining that the control interface 1454 is rotated. The arrangement instruction 1450 may indicate that the interface elements are to be arranged in the control interface 1454.

At step 1110, the interface elements are rearranged in the control interface to cause the interface elements to be presented in the control interface in the designated order. For instance, the interface elements may be rearranged at step 1110 in response to determining that the control interface is rotated at step 1108. In an example implementation, the arrangement logic 1432 rearranges the interface elements in the control interface 1454. For instance, the arrangement logic 1432 may rearrange the interface elements in the control interface 1454 in response to receiving the arrangement instruction 1450.

In some implementations of this aspect, one or more steps 1102, 1104, 1106, 1108, and/or 1110 of flowchart 1100 may not be performed. Moreover, steps in addition to or in lieu of steps 1102, 1104, 1106, 1108, and/or 1110 may be performed.

Figure 12:
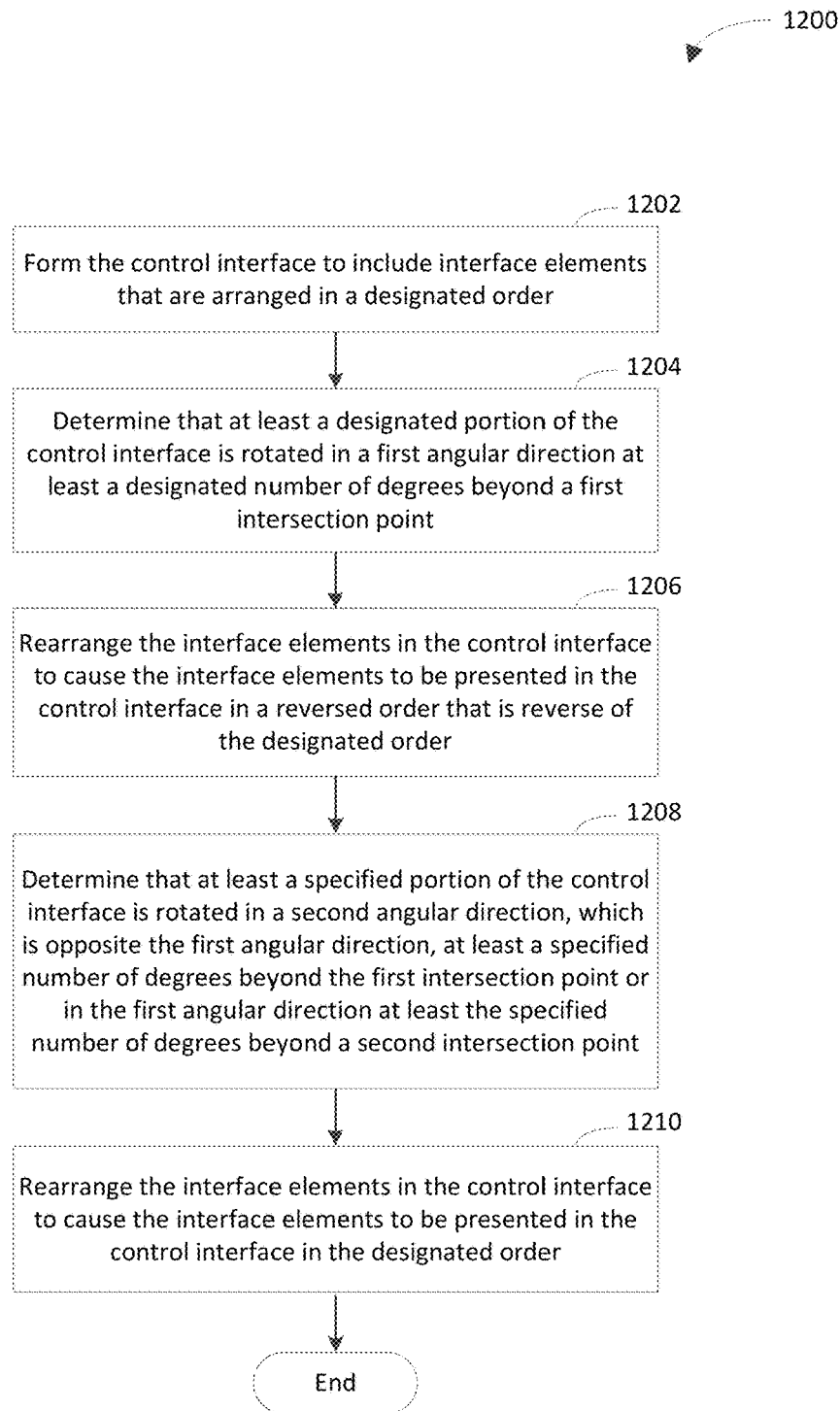

In another aspect of this embodiment, the method of flowchart 900 includes one or more of the steps shown in flowchart 1200 of FIG. 12. In accordance with this aspect, an axis that includes the specified location is defined between a top edge of the touch screen and a bottom edge of the touch screen based on a standard viewing orientation of the touch screen. In further accordance with this aspect, a path along which the control interface rotates intersects the axis at a first intersection point and a second intersection point.

As shown in FIG. 12, the method of flowchart 1200 begins at step 1202. In step 1202, the control interface is formed to include multiple interface elements that are arranged in a designated order. In an example implementation, the interface logic 1418 forms the control interface 1454 to include the interface elements.

At step 1204, a determination is made that at least a designated portion of the control interface is rotated in a first angular direction at least a designated number of degrees beyond the first intersection point. For instance, the determination may be made at step 1204 in response to forming the control interface at step 1202. In an example implementation, the determination logic 1416 determines that at least the designated portion of the control interface 1454 is rotated in the first angular direction at least the designated number of degrees beyond the first intersection point. In accordance with this implementation, the determination logic 1416 may generate an arrangement instruction 1450 in response to making the determination. The arrangement instruction 1450 may indicate that the interface elements are to be arranged in the control interface 1454.

At step 1206, the interface elements are rearranged in the control interface to cause the interface elements to be presented in the control interface in a reversed order that is reverse of the designated order. For instance, the interface elements may be rearranged at step 1206 in response to determining that at least the designated portion of the control interface is rotated at step 1204. In an example implementation, arrangement logic 1432 rearranges the interface elements in the control interface 1454. For instance, the arrangement logic 1432 may rearrange the interface elements in the control interface 1454 in response to receiving the arrangement instruction 1450.

At step 1208, a determination is made that at least a specified portion of the control interface is rotated in a second angular direction, which is opposite the first angular direction, at least a specified number of degrees beyond the first intersection point or in the first angular direction at least the specified number of degrees beyond the second intersection point. For instance, the determination may be made at step 1208 in response to rearranging the interface elements at step 1206. In an example implementation, the determination logic 1416 determines that at least the specified portion of the control interface 1454 is rotated in the second angular direction at least the specified number of degrees beyond the first intersection point or in the first angular direction at least the specified number of degrees beyond the second intersection point. In accordance with this implementation, the determination logic 1416 may generate an arrangement instruction 1450 in response to making the determination. The arrangement instruction 1450 may indicate that the interface elements are to be arranged in the control interface 1454.

At step 1210, the interface elements are rearranged in the control interface to cause the interface elements to be presented in the control interface in the designated order. For instance, the interface elements may be rearranged at step 1210 in response to determining that at least the specified portion of the control interface is rotated at step 1208. In an example implementation, the arrangement logic 1432 rearranges the interface elements in the control interface 1454. For instance, the arrangement logic 1432 may rearrange the interface elements in the control interface 1454 in response to receiving the arrangement instruction 1450.

The designated number of degrees and the specified number of degrees may be same or different. For instance, the designated number of degrees and/or the specified number of degrees may be approximately 5 degrees, 10 degrees, or 15 degrees. Moreover, the designated portion of the control interface and the specified portion of the control interface may be same or different.

In some implementations of this aspect, one or more steps 1202, 1204, 1206, 1208, and/or 1210 of flowchart 1200 may not be performed. Moreover, steps in addition to or in lieu of steps 1202, 1204, 1206, 1208, and/or 1210 may be performed.

In yet another aspect of this embodiment, the method of flowchart 900 includes determining that a distance between the specified location and a second location on the touch screen that corresponds to the pointing device is less than or equal to a threshold distance. For example, the determination logic 1416 may determine that the distance between the specified location and the second location is less than or equal to the threshold distance. In accordance with this example, the determination logic 1416 may generate a rotation instruction 1448 in response to determining that the distance between the specified location and the second location is less than or equal to the threshold distance. The rotation instruction 1448 may indicate that the rotating of the control interface 1454 about the specified location is to be discontinued. In accordance with this aspect, the method of flowchart 900 further includes discontinuing the rotating of the control interface about the specified location to track the movement of the pointing device in response to determining that the distance between the specified location and the second location is less than or equal to the threshold distance. For example, the rotation logic 1430 may discontinue the rotating of the control interface 1454 about the specified location. In accordance with this example, the rotation logic 1430 may discontinue the rotating of the control interface 1454 about the specified location in response to receiving the rotation instruction 1448. In one example, discontinuing the rotating may include locking the control interface to a fixed location (e.g., a location that does not change as the pointing device moves with reference to the specified location). In another example, discontinuing the rotating may include causing the control interface to be stationary while the pointing device moves with reference to the specified location. The threshold distance may be any suitable distance, such as approximately 4 centimeters (cm), 5 cm, or 6 cm.

In an example implementation of this aspect, the threshold distance is proportional to a size of the touch screen. For instance, a relatively greater size of the touch screen may correspond to a relatively greater threshold distance. In accordance with this implementation, a relatively lesser size of the touch screen may correspond to a relatively lesser threshold distance.

In another example implementation of this aspect, the method of flowchart 900 includes flipping the control interface over in response to discontinuing the rotating. For instance, the flipping logic 1426 may flip the control interface 1454 over.

In still another aspect of this embodiment, the method of flowchart 900 includes determining that a distance between the control interface and a designated location on the touch screen that corresponds to the pointing device is less than or equal to a threshold distance. For instance, the determination logic 1416 may determine that the distance between the control interface 1454 and the designated location is less than or equal to the threshold distance. In accordance with this aspect, the method of flowchart 900 further includes discontinuing the rotating of the control interface about the specified location to track the movement of the pointing device in response to determining that the distance between the control interface and the designated location is less than or equal to the threshold distance. For instance, the rotation logic 1430 may discontinue the rotating of the control interface 1454 about the specified location.

Figure 13:
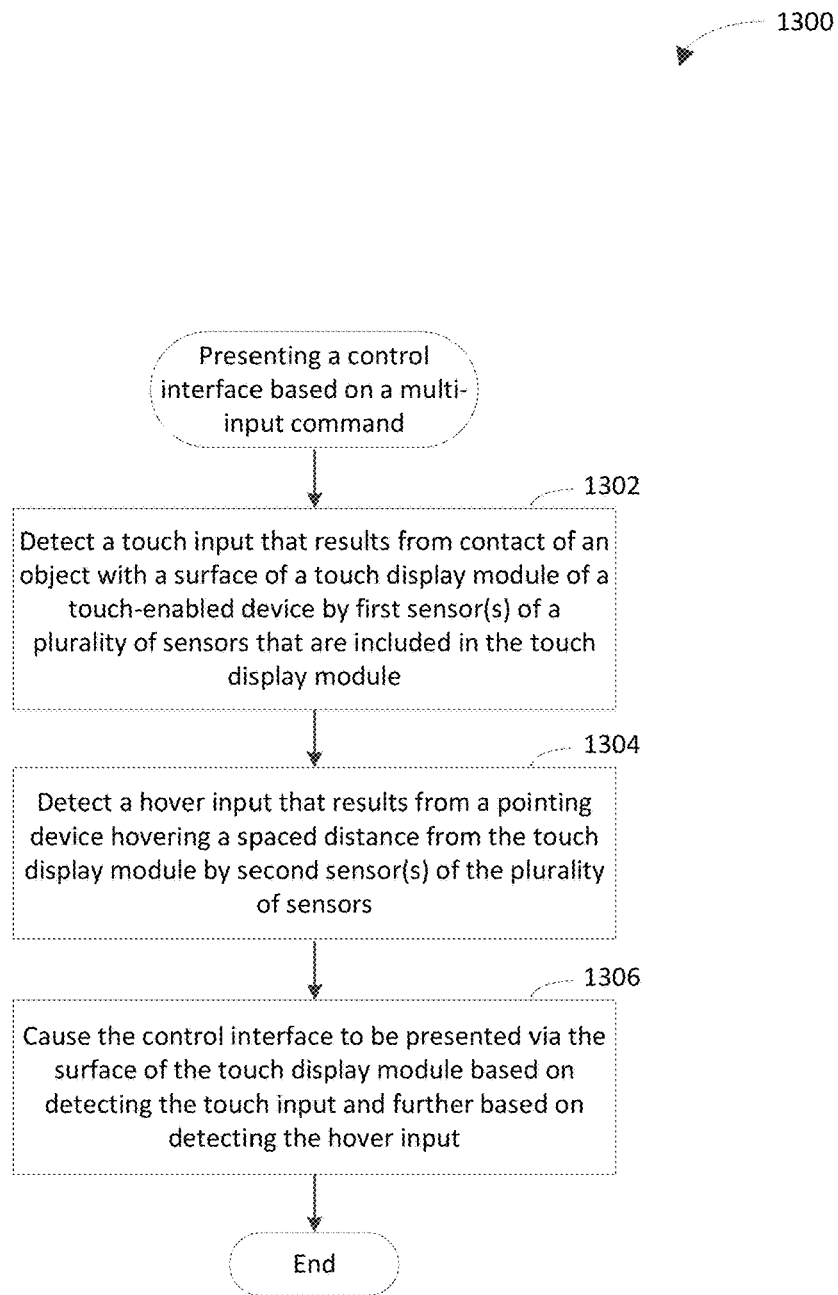
Figure 14:
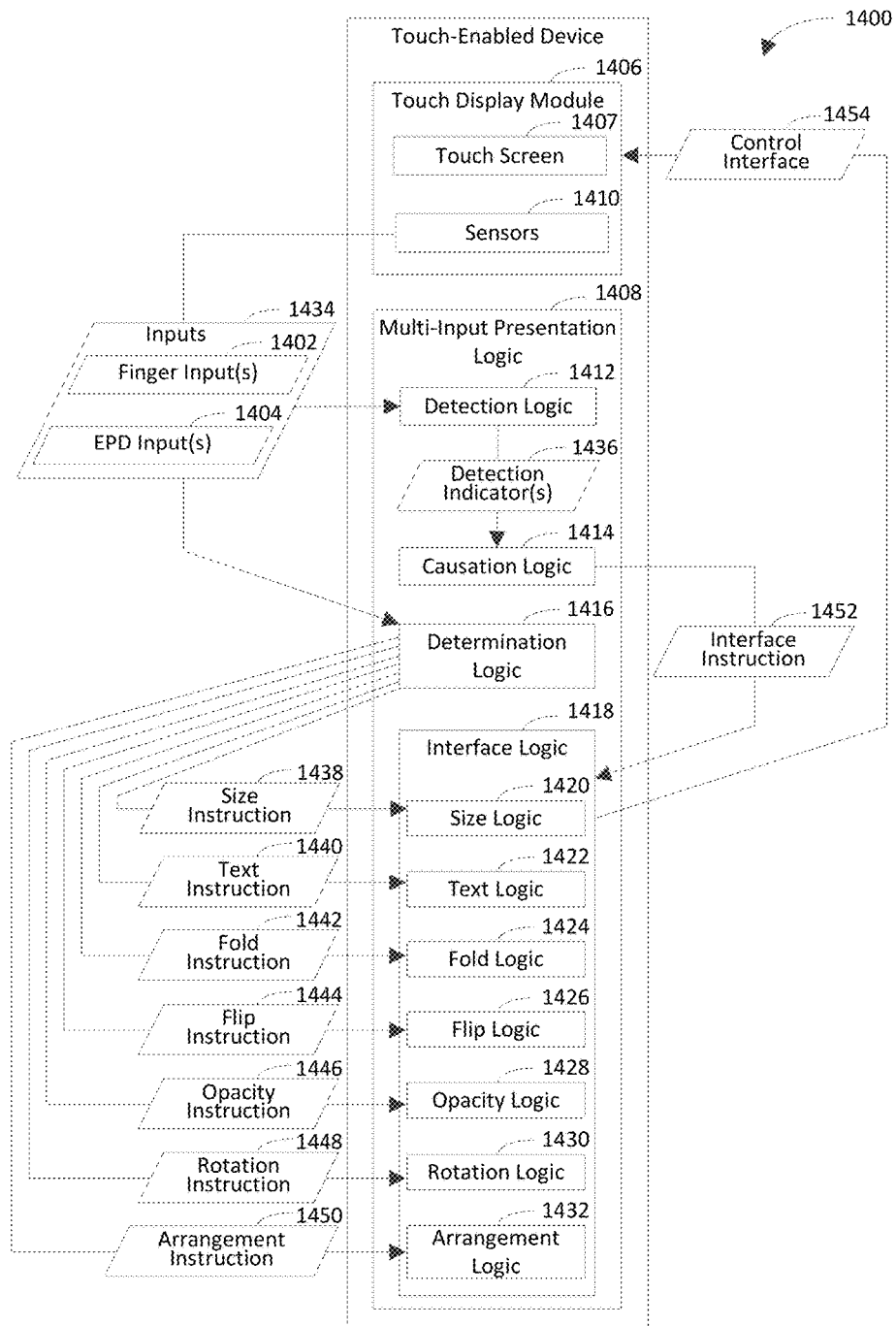

As shown in FIG. 13, the method of flowchart 1300 begins at step 1302. In step 1302, a touch input that results from contact of an object with a surface of a touch display module of a touch-enabled device is detected by first sensor(s) of a plurality of sensors that are included in the touch display module. In an example implementation, the first sensor(s) are included in the sensors 1410 of the touch display module 1406. In accordance with this implementation, the first sensor(s) detect the touch input that results from contact of the object with the surface of the touch display module 1406.

At step 1304, a hover input that results from a pointing device hovering a spaced distance from the touch display module is detected by second sensor(s) of the plurality of sensors. In an example implementation, the second sensor(s) are included in the sensors 1410. In accordance with this implementation, the second sensor(s) detect the hover input that results from the pointing device 104 hovering the spaced distance from the touch display module 1406.

At step 1306, the control interface is caused to be presented via the surface of the touch display module based on detecting the touch input and further based on detecting the hover input. In an example implementation, the causation logic 1414 and/or the interface logic 1418 cause the control interface 1454 to be presented via the surface of the touch display module 1406.

In some example embodiments, one or more steps 1302, 1304, and/or 1306 of flowchart 1300 may not be performed. Moreover, steps in addition to or in lieu of steps 1302, 1304, and/or 1306 may be performed.

It will be recognized that the touch-enabled device 1400 may not include one or more of the touch display module 1406, the touch screen 1407, the sensors 1410, the detection logic 1412, the causation logic 1414, the determination logic 1416, the interface logic 1418, the size logic 1420, the text logic 1422, the fold logic 1424, the flip logic 1426, the opacity logic 1428, the rotation logic 1430, and/or the arrangement logic 1432. Furthermore, the touch-enabled device 1400 may include components in addition to or in lieu of touch display module 1406, the touch screen 1407, the sensors 1410, the detection logic 1412, the causation logic 1414, the determination logic 1416, the interface logic 1418, the size logic 1420, the text logic 1422, the fold logic 1424, the flip logic 1426, the opacity logic 1428, the rotation logic 1430, and/or the arrangement logic 1432.

Figure 15:
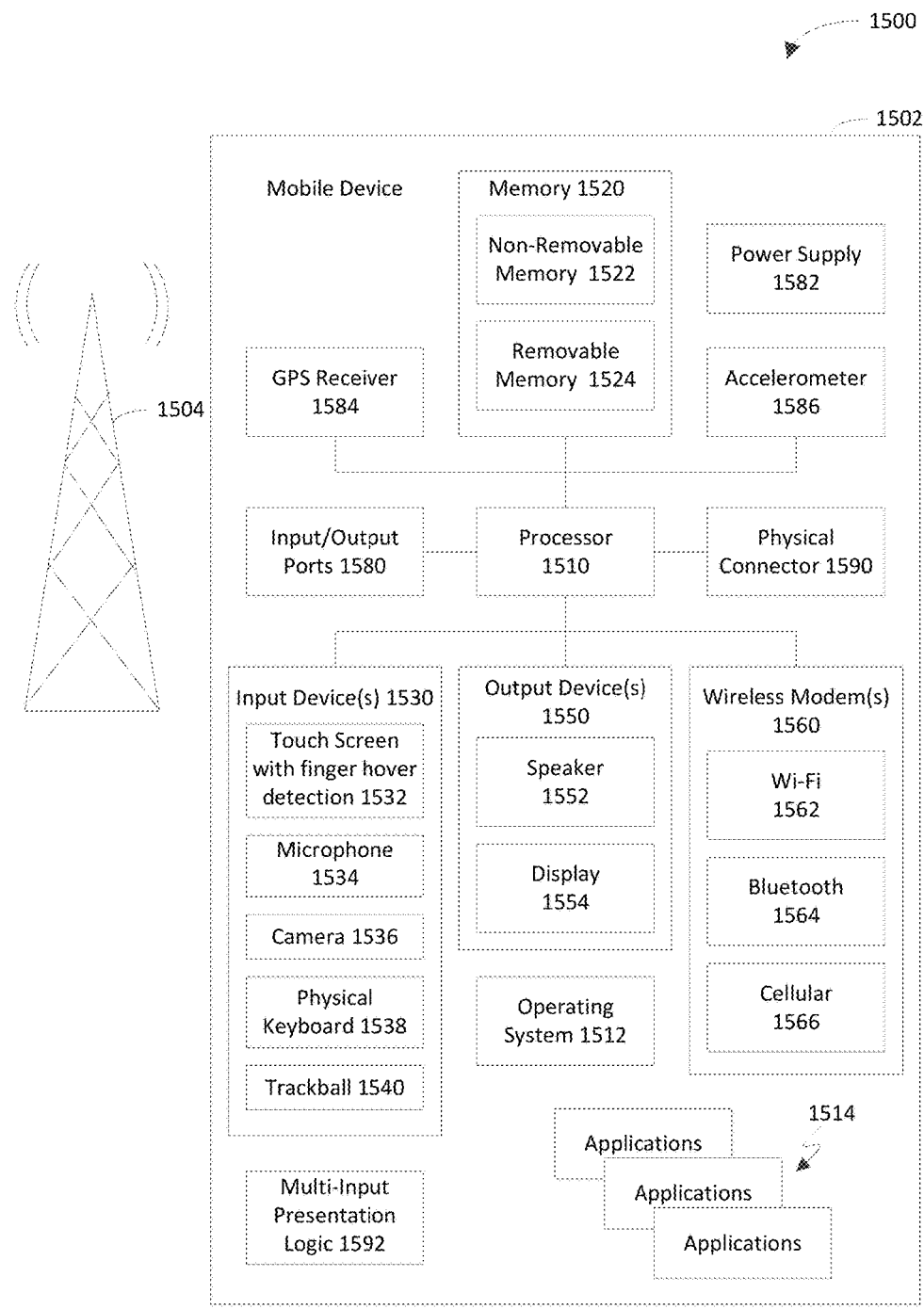
FIG. 15 is a system diagram of an example mobile device having multi-input presentation functionality in accordance with an embodiment.

FIG. 15 is a system diagram depicting an exemplary mobile device 1500 including a variety of optional hardware and software components, shown generally as 1502. Any components 1502 in the mobile device can communicate with any other component, though not all connections are shown, for ease of illustration. The mobile device 1500 may be any of a variety of computing devices (e.g., cell phone, smartphone, handheld computer, Personal Digital Assistant (PDA), etc.) and may allow wireless two-way communications with one or more mobile communications networks 1504, such as a cellular or satellite network, or with a local area or wide area network.

The mobile device 150 includes processor(s) 1510 (e.g., signal processor(s), microprocessor(s), ASIC(s), or other processing logic circuitry), which may be referred to as a controller, for performing such tasks as signal coding, data processing, input/output processing, power control, and/or other functions. An operating system 1512 controls the allocation and usage of the components 1502 and support for one or more application programs 1514 (a.k.a. applications). The application programs 1514 may include common mobile computing applications (e.g., email applications, calendars, contact managers, web browsers, messaging applications) and any other computing applications (e.g., word processing applications, mapping applications, or media player applications).

The mobile device 1500 further includes a memory 1520. The memory 1520 may include non-removable memory 1522 and/or removable memory 1524. The non-removable memory 1522 may include RAM, ROM, flash memory, a hard disk, or other well-known memory storage technologies. The removable memory 1524 may include flash memory or a Subscriber Identity Module (SIM) card, which is well known in GSM communication systems, or other well-known memory storage technologies, such as "smart cards." The memory 1520 may be used for storing data and/or code for running the operating system 1512 and the applications 1514. Example data can include web pages, text, images, sound files, video data, or other data sets to be sent to and/or received from one or more network servers or other devices via one or more wired or wireless networks. The memory 1520 may be used to store a subscriber identifier, such as an International Mobile Subscriber Identity (IMSI), and an equipment identifier, such as an International Mobile Equipment Identifier (IMEI). Such identifiers may be transmitted to a network server to identify users and equipment.

The mobile device 1500 may support one or more input devices 1530, such as a touch screen 1532, microphone 1534, camera 1536, physical keyboard 1538 and/or trackball 1540 and one or more output devices 1550, such as a speaker 1552 and a display 1554. Touch screens, such as touch screen 1532, may detect input in any of a variety of ways. For example, a capacitive touch screen may detect touch and/or hover input when an object (e.g., a fingertip) distorts or interrupts an electrical current running across a surface of the capacitive touch screen. As another example, a touch screen may use optical sensor(s) to detect touch and/or hover input when beam(s) from the optical sensor(s) are interrupted. Physical contact with the surface of the screen is not necessary for input to be detected by some touch screens. For example, the touch screen 1532 can support hover detection of objects using capacitive sensing, as is well understood in the art. Other detection techniques can be used, including camera-based detection and ultrasonic-based detection. To implement a hover operation, an object is typically placed within a predetermined spaced distance from the touch screen (e.g., between 0.1 to 0.25 inches, between 0.0.25 inches and 0.05 inches, between 0.0.5 inches and 0.75 inches, between 0.75 inches and 1 inch, or between 1 inch and 1.5 inches).

The mobile device 1500 includes multi-input presentation logic 1592. The multi-input presentation logic 1592 is configured to cause a control interface to be presented based on a multi-input command in accordance with any one or more of the techniques described herein.

Other possible output devices (not shown) can include piezoelectric or other haptic output devices. Some devices can serve more than one input/output function. For example, touch screen 1532 and display 1554 can be combined in a single input/output device. The input devices 1530 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1512 or applications 1514 may include speech-recognition software as part of a voice control interface that allows a user to operate the mobile device 1500 via voice commands. Further, the mobile device 1500 may include input devices and software that allow for user interaction via a user's spatial gestures, such as detecting and interpreting gestures to provide input to a gaming application.

Wireless modem(s) 1560 may be coupled to antenna(s) (not shown) and may support two-way communications between the processor 1510 and external devices, as is well understood in the art. The modem(s) 1560 are shown generically and can include a cellular modem 1566 for communicating with the mobile communication network 1504 and/or other radio-based modems (e.g., Bluetooth 1564 and/or Wi-Fi 1562). At least one of the wireless modem(s) 1560 is typically configured for communication with one or more cellular networks, such as a GSM network for data and voice communications within a single cellular network, between cellular networks, or between the mobile device and a public switched telephone network (PSTN).

The mobile device 1500 may further include at least one input/output port 1580, a power supply 1582, a satellite navigation system receiver 1584, such as a Global Positioning System (GPS) receiver, an accelerometer 1586, and/or a physical connector 1590, which can be a USB port, IEEE 1394 (FireWire) port, and/or RS-232 port. The illustrated components 1502 are not required or all-inclusive, as any components can be deleted and other components can be added as would be recognized by one skilled in the art.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any one or more of multi-input presentation logic 108, 208, 308, 408, 508, 608, 708, 808, and/or 1408, detection logic 1412, causation logic 1414, determination logic 1416, interface logic 1418, size logic 1420, text logic 1422, fold logic 1424, flip logic 1426, opacity logic 1428, rotation logic 1430, arrangement logic 1432, components 1502, flowchart 900, flowchart 1000, flowchart 1100, flowchart 1200, and/or flowchart 1300 may be implemented in hardware, software, firmware, or any combination thereof.

For example, any one or more of multi-input presentation logic 108, 208, 308, 408, 508, 608, 708, 808, and/or 1408, detection logic 1412, causation logic 1414, determination logic 1416, interface logic 1418, size logic 1420, text logic 1422, fold logic 1424, flip logic 1426, opacity logic 1428, rotation logic 1430, arrangement logic 1432, components 1502, flowchart 900, flowchart 1000, flowchart 1100, flowchart 1200, and/or flowchart 1300 may be implemented, at least in part, as computer program code configured to be executed in one or more processors.

In another example, any one or more of multi-input presentation logic 108, 208, 308, 408, 508, 608, 708, 808, and/or 1408, detection logic 1412, causation logic 1414, determination logic 1416, interface logic 1418, size logic 1420, text logic 1422, fold logic 1424, flip logic 1426, opacity logic 1428, rotation logic 1430, arrangement logic 1432, components 1502, flowchart 900, flowchart 1000, flowchart 1100, flowchart 1200, and/or flowchart 1300 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

A first example system to present a control interface based on a multi-input command comprises at least one element including at least one of (a) one or more processors, (b) hardware logic, (c) electrical circuitry; a touch display module; detection logic; and causation logic. The touch display module includes a touch screen and a plurality of sensors. The detection logic, implemented using the at least one element, is configured to detect a finger input of a finger using one or more first sensors of the plurality of sensors, the detection logic further configured to detect a pointing device that is in a hover position with regard to the touch display module using one or more second sensors of the plurality of sensors, the hover position characterized by the pointing device being a spaced distance from the touch display module. The causation logic, implemented using the at least one element, is configured to cause a control interface to be presented on the touch screen based on detection of the finger input and further based on detection of the pointing device in the hover position.

In a first aspect of the first example system, the one or more first sensors are associated with a specified location on the touch screen. In accordance with the first aspect, the detection logic is configured to detect movement of the pointing device toward the specified location using the one or more second sensors while the pointing device is a spaced distance from the touch display module. In further accordance with the first aspect, the causation logic is configured to cause the control interface to be presented on the touch screen based on detection of the finger input and further based on detection of the movement of the pointing device toward the specified location while the pointing device is a spaced distance from the touch display module.

In a second aspect of the first example system, the one or more first sensors are associated with a first location on the touch screen. In accordance with the second aspect, the one or more second sensors are associated with a second location on the touch screen. In further accordance with the second aspect, the causation logic is configured to cause the control interface to be presented on the touch screen further based on a distance between the first location and the second location being less than or equal to a threshold distance. The second aspect of the first example system may be implemented in combination with the first aspect of the first example system, though the example embodiments are not limited in this respect.

In a third aspect of the first example system, the one or more first sensors are associated with a specified location on the touch screen. In accordance with the third aspect, the first example system further comprises determination logic configured to determine whether the pointing device is moving toward the specified location. In further accordance with the third aspect, the first example system further comprises size logic configured to increase a size of the control interface as the pointing device is moving toward the specified location. The third aspect of the first example system may be implemented in combination with the first and/or second aspect of the first example system, though the example embodiments are not limited in this respect.

In an example of the third aspect of the first example system, the determination logic is configured to determine that the pointing device moves from a first location that corresponds to a first point on the touch screen to a second location that corresponds to a second point on the touch screen, the first point being a first distance from the specified location, the second point being a second distance from the specified location, the first distance being greater than the second distance. In accordance with this example, the control interface includes a plurality of interface elements at the first location that provide a first amount of information regarding at least one functionality of the touch-enabled device. In further accordance with this example, the size logic is configured to expand the plurality of interface elements as the pointing device moves from the first location to the second location to provide a second amount of information regarding the at least one functionality of the touch-enabled device, the second amount of information being greater than the first amount of information.

In an implementation of this example of the third aspect of the first example system, the plurality of interface elements includes a first number of respective discrete colors. In accordance with this implementation, the size logic is configured to expand the plurality of interface elements as the pointing device moves from the first location to the second location to provide a color wheel that includes a second number of colors that is greater than the first number of colors.

In a fourth aspect of the first example system, the one or more first sensors are associated with a specified location on the touch screen. In accordance with the fourth aspect, the control interface includes a plurality of interface elements. In further accordance with the fourth aspect, the first example system further comprises determination logic configured to determine whether the pointing device moves toward the specified location. In further accordance with the fourth aspect, the first example system further comprises text logic configured to introduce text proximate the plurality of interface elements in response to a determination that the pointing device moves toward the specified location, the text describing a plurality of actions that is associated with the plurality of respective interface elements, each interface element being selectable to cause the respective action with which the interface element is associated to be performed. The fourth aspect of the first example system may be implemented in combination with the first, second, and/or third aspect of the first example system, though the example embodiments are not limited in this respect.

In a fifth aspect of the first example system, the one or more first sensors are associated with a specified location on the touch screen. In accordance with the fifth aspect, the first example system further comprises determination logic configured to determine that the pointing device is moving toward the specified location. In further accordance with the fifth aspect, the first example system further comprises fold logic configured to unfold the control interface as the pointing device is moving toward the specified location. The fifth aspect of the first example system may be implemented in combination with the first, second, third, and/or fourth aspect of the first example system, though the example embodiments are not limited in this respect.

In an example of the fifth aspect of the first example system, the determination logic is configured to determine whether a distance between the specified location and a second location on the touch screen that corresponds to the pointing device is less than or equal to a threshold distance. In accordance with this example, the first example system further comprises flip logic configured to flip the control interface over to display a plurality of interface elements that are selectable to invoke a plurality of respective functionalities of the touch-enabled device.

In an implementation of this example of the fifth aspect of the first example system, each interface element of the plurality of interface elements is configured to provide a respective menu in response to selection of the respective interface element.

In another implementation of this example of the fifth aspect of the first example system, each interface element of the plurality of interface elements is configured to invoke a respective command with regard to a selected item on the touch screen in response to selection of the respective interface element.

In a sixth aspect of the first example system, the first example system further comprises determination logic configured to determine whether a plurality of pointing devices is associated with a plurality of respective users, the determination logic further configured to determine whether the pointing device in the hover position is associated with a specified user, the determination logic further configured to determine whether the finger input is received from the specified user. In accordance with the sixth aspect, the causation logic is configured to cause the control interface to be presented on the touch screen further based on a determination that the pointing device in the hover position is associated with the specified user and further based on a determination that the finger input is received from the specified user. The sixth aspect of the first example system may be implemented in combination with the first, second, third, fourth, and/or fifth aspect of the first example system, though the example embodiments are not limited in this respect.

In a seventh aspect of the first example system, the one or more first sensors are associated with a specified location on the touch screen. In accordance with the seventh aspect, the causation logic is configured to cause the control interface to be presented at an interface location on the touch screen that is based on the specified location. The seventh aspect of the first example system may be implemented in combination with the first, second, third, fourth, fifth, and/or sixth aspect of the first example system, though the example embodiments are not limited in this respect.

In an eighth aspect of the first example system, the first example system further comprises determination logic configured to detect whether the pointing device moves toward the control interface. In accordance with the eighth aspect, the first example system further comprises opacity logic configured to increase an opacity of the control interface as the pointing device moves toward the control interface. The eighth aspect of the first example system may be implemented in combination with the first, second, third, fourth, fifth, sixth, and/or seventh aspect of the first example system, though the example embodiments are not limited in this respect.

In an example of the eighth aspect of the first example system, the opacity logic is configured to set the opacity of the control interface to be a fixed opacity in response to a distance between the pointing device and the control interface being less than or equal to a threshold distance.

In another example of the eighth aspect of the first example system, the one or more first sensors are associated with a specified location on the touch screen. In accordance with this example, the opacity logic is configured to set the opacity of the control interface to be a fixed opacity in response to a distance between the pointing device and the specified location being less than or equal to a threshold distance.

In a ninth aspect of the first example system, the first example system further comprises interface logic configured to form the control interface to include a plurality of interface elements, each interface element of the plurality of interface elements configured to provide a respective menu in response to selection of the respective interface element. The ninth aspect of the first example system may be implemented in combination with the first, second, third, fourth, fifth, sixth, seventh, and/or eighth aspect of the first example system, though the example embodiments are not limited in this respect.

In a tenth aspect of the first example system, the first example system further comprises interface logic configured to form the control interface to include a plurality of interface elements, each interface element of the plurality of interface elements configured to invoke a respective command with regard to a selected item on the touch screen in response to selection of the respective interface element. The tenth aspect of the first example system may be implemented in combination with the first, second, third, fourth, fifth, sixth, seventh, eighth, and/or ninth aspect of the first example system, though the example embodiments are not limited in this respect.

In an eleventh aspect of the first example system, the one or more first sensors are associated with a specified location on the touch screen. In accordance with the eleventh aspect, the first example system further comprises rotation logic configured to rotate the control interface about the specified location to track movement of the pointing device with reference to the specified location. The eleventh aspect of the first example system may be implemented in combination with the first, second, third, fourth, fifth, sixth, seventh, eighth, ninth, and/or tenth aspect of the first example system, though the example embodiments are not limited in this respect.

In an example of the eleventh aspect of the first example system, an axis that includes the specified location is defined between a top edge of the touch screen and a bottom edge of the touch screen based on a standard viewing orientation of the touch screen. In accordance with this example, a path along which the control interface rotates intersects the axis at a first intersection point and a second intersection point. In further accordance with this example, the first example system further comprises interface logic configured to form the control interface to include a plurality of interface elements that are arranged in a designated order. In further accordance with this example, the first example system further comprises determination logic configured to determine whether the control interface is rotated in a first angular direction through the first intersection point in response to the control interface being formed to include the plurality of interface elements that are arranged in the designated order. In further accordance with this example, the interface logic comprises arrangement logic configured to rearrange the plurality of interface elements in the control interface to cause the plurality of interface elements to be presented in the control interface in a reversed order that is reverse of the designated order in response to a determination that the control interface is rotated in the first angular direction through the first intersection point.

In an implementation of this example of the eleventh aspect of the first example system, the determination logic is configured to determine whether the control interface is rotated in a second angular direction, which is opposite the first angular direction, through the first intersection point or in the first angular direction through the second intersection point in response to the determination that the control interface is rotated in the first angular direction through the first intersection point. In accordance with this implementation, the arrangement logic is configured to rearrange the plurality of interface elements in the control interface to cause the plurality of interface elements to be presented in the control interface in the designated order in response to a determination that the control interface is rotated in the second angular direction through the first intersection point or in the first angular direction through the second intersection point.

In another implementation of this example of the eleventh aspect of the first example system, the determination logic is configured to determine whether at least a designated portion of the control interface is rotated in the first angular direction at least a designated number of degrees beyond the first intersection point. In accordance with this implementation, the arrangement logic is configured to rearrange the plurality of interface elements in the control interface to cause the plurality of interface elements to be presented in the control interface in the reversed order in response to the determination that at least the designated portion of the control interface is rotated in the first angular direction at least the designated number of degrees beyond the first intersection point.

In another example of the eleventh aspect of the first example system, an axis that includes the specified location is defined between a top edge of the touch screen and a bottom edge of the touch screen based on a standard viewing orientation of the touch screen. In accordance with this example, a path along which the control interface rotates intersects the axis at a first intersection point and a second intersection point. In further accordance with this example, the first example system further comprises interface logic configured to form the control interface to include a plurality of interface elements that are arranged in a designated order. In further accordance with this example, the first example system further comprises determination logic configured to determine whether at least a designated portion of the control interface is rotated in a first angular direction at least a designated number of degrees beyond the first intersection point in response to the control interface being formed to include the plurality of interface elements that are arranged in the designated order. In further accordance with this example, the interface logic comprises arrangement logic configured to rearrange the plurality of interface elements in the control interface to cause the plurality of interface elements to be presented in the control interface in a reversed order that is reverse of the designated order in response to a determination that at least the designated portion of the control interface is rotated in the first angular direction at least the designated number of degrees beyond the first intersection point. In further accordance with this example, the determination logic is further configured to determine whether at least a specified portion of the control interface is rotated in a second angular direction, which is opposite the first angular direction, at least a specified number of degrees beyond the first intersection point or in the first angular direction at least the specified number of degrees beyond the second intersection point in response to the plurality of interface elements be rearranged in the control interface to cause the plurality of interface elements to be presented in the control interface in the reversed order. In further accordance with this example, the arrangement logic is configured to rearrange the plurality of interface elements in the control interface to cause the plurality of interface elements to be presented in the control interface in the designated order in response to a determination that at least the specified portion of the control interface is rotated in the second angular direction at least the specified number of degrees beyond the first intersection point or in the first angular direction at least the specified number of degrees beyond the second intersection point.

In yet another example of the eleventh aspect of the first example system, the first example system further comprises determination logic configured to determine whether a distance between the specified location and a second location on the touch screen that corresponds to the pointing device is less than or equal to a threshold distance. In accordance with this example, the rotation logic is further configured to discontinue the rotating of the control interface about the specified location to track the movement of the pointing device in response to a determination that the distance between the specified location and the second location is less than or equal to the threshold distance.

In still another example of the eleventh aspect of the first example system, the first example system further comprises determination logic configured to determine whether a distance between the control interface and a designated location on the touch screen that corresponds to the pointing device is less than or equal to a threshold distance. In accordance with this example, the rotation logic is further configured to discontinue the rotating of the control interface about the specified location to track the movement of the pointing device in response to a determination that the distance between the control interface and the designated location is less than or equal to the threshold distance.

In an twelfth aspect of the first example system, the first example system further comprises determination logic configured to determine a frequency with which each of a plurality of commands is historically received via the control interface. In accordance with the twelfth aspect, the first example system further comprises interface logic configured to form the control interface to include a plurality of interface elements that corresponds to the plurality of respective commands. In further accordance with the twelfth aspect, the interface logic comprises arrangement logic configured to arrange the plurality of interface elements in the control interface to have a plurality of respective proximities to a midpoint of the control interface, the plurality of proximities based on the respective frequencies with which the respective commands that correspond to the respective interface elements are historically received via the control interface. The twelfth aspect of the first example system may be implemented in combination with the first, second, third, fourth, fifth, sixth, seventh, eighth, ninth, tenth, and/or eleventh aspect of the first example system, though the example embodiments are not limited in this respect.

In an thirteenth aspect of the first example system, the first example system further comprises determination logic configured to determine a frequency with which each of a plurality of commands is historically received via the control interface. In accordance with the thirteenth aspect, the first example system further comprises interface logic configured to form the control interface to include a plurality of interface elements that corresponds to the plurality of respective commands. In accordance with the thirteenth aspect, the interface logic comprises arrangement logic configured to arrange the plurality of interface elements in the control interface to have a plurality of respective proximities to a top edge of the touch screen based on a standard viewing orientation of the touch screen, the plurality of proximities based on the respective frequencies with which the respective commands that correspond to the respective interface elements are historically received via the control interface. The thirteenth aspect of the first example system may be implemented in combination with the first, second, third, fourth, fifth, sixth, seventh, eighth, ninth, tenth, eleventh, and/or twelfth aspect of the first example system, though the example embodiments are not limited in this respect.

A second example system comprises at least one element including at least one of (a) one or more processors, (b) hardware logic, (c) electrical circuitry; and a touch display module. The at least one element is configured to detect a touch input that results from contact of an object with a surface of the touch display module using one or more first sensors of the plurality of sensors. The at least one element is configured to detect a hover input that results from a pointing device hovering a spaced distance from the touch display module using one or more second sensors of the plurality of sensors. The at least one element is configured to cause a control interface to be presented via the surface of the touch display module based on detection of the touch input and further based on detection of the hover input.

In a first example method of presenting a control interface on a touch screen that is included in a touch display module of a touch-enabled device based on a multi-input command, a finger input of a finger is detected by one or more first sensors of a plurality of sensors that are included in the touch display module of the touch-enabled device. A pointing device that is in a hover position with regard to the touch display module is detected by one or more second sensors of the plurality of sensors, the hover position characterized by the pointing device being a spaced distance from the touch display module. A control interface is caused to be presented on the touch screen, by at least one processor of the touch-enabled device, based on detecting the finger input and further based on detecting the pointing device in the hover position.

In a first aspect of the first example method, detecting the finger input comprises detecting the finger input of the finger by the one or more first sensors that are associated with a specified location on the touch screen. In accordance with the first aspect, detecting the pointing device in the hover position comprises detecting movement of the pointing device toward the specified location while the pointing device is a spaced distance from the touch display module. In further accordance with the first aspect, causing the control interface to be presented comprises causing the control interface to be presented on the touch screen based on detecting the finger input and further based on detecting the movement of the pointing device toward the specified location while the pointing device is a spaced distance from the touch display module.

In a second aspect of the first example method, detecting the finger input comprises detecting the finger input of the finger by the one or more first sensors that are associated with a first location on the touch screen. In accordance with the second aspect, detecting the pointing device in the hover position comprises detecting the pointing device in the hover position by the one or more second sensors that are associated with a second location on the touch screen. In further accordance with the second aspect, causing the control interface to be presented comprises causing the control interface to be presented on the touch screen further based on a distance between the first location and the second location being less than or equal to a threshold distance. The second aspect of the first example method may be implemented in combination with the first aspect of the first example method, though the example embodiments are not limited in this respect.

In a third aspect of the first example method, detecting the finger input comprises detecting the finger input of the finger by the one or more first sensors that are associated with a specified location on the touch screen. In accordance with the third aspect, the first example method further comprises determining that the pointing device is moving toward the specified location. In further accordance with the third aspect, the first example method further comprises increasing a size of the control interface as the pointing device is moving toward the specified location. The third aspect of the first example method may be implemented in combination with the first and/or second aspect of the first example method, though the example embodiments are not limited in this respect.

In an example of the third aspect of the first example method, the pointing device moves from a first location that corresponds to a first point on the touch screen to a second location that corresponds to a second point on the touch screen, the first point being a first distance from the specified location, the second point being a second distance from the specified location, the first distance being greater than the second distance. In accordance with this example, the control interface includes a plurality of interface elements at the first location that provide a first amount of information regarding at least one functionality of the touch-enabled device. In further accordance with this example, increasing the size of the control interface comprises expanding the plurality of interface elements as the pointing device moves from the first location to the second location to provide a second amount of information regarding the at least one functionality of the touch-enabled device, the second amount of information being greater than the first amount of information.

In an implementation of this example of the third aspect of the first example method, the plurality of interface elements includes a first number of respective discrete colors. In accordance with this implementation, expanding the plurality of interface elements comprises expanding the plurality of interface elements to provide a color wheel that includes a second number of colors that is greater than the first number of colors.

In a fourth aspect of the first example method, detecting the finger input comprises detecting the finger input of the finger by the one or more first sensors that are associated with a specified location on the touch screen. In accordance with the fourth aspect, the control interface includes a plurality of interface elements. In further accordance with the fourth aspect, the first example method further comprises determining that the pointing device moves toward the specified location. In further accordance with the fourth aspect, the first example method further comprises introducing text proximate the plurality of interface elements in response to determining that the pointing device moves toward the specified location, the text describing a plurality of actions that is associated with the plurality of respective interface elements, each interface element being selectable to cause the respective action with which the interface element is associated to be performed. The fourth aspect of the first example method may be implemented in combination with the first, second, and/or third aspect of the first example method, though the example embodiments are not limited in this respect.

In a fifth aspect of the first example method, detecting the finger input comprises detecting the finger input of the finger by the one or more first sensors that are associated with a specified location on the touch screen. In accordance with the fifth aspect, the first example method further comprises determining that the pointing device is moving toward the specified location. In further accordance with the fifth aspect, the first example method further comprises unfolding the control interface as the pointing device is moving toward the specified location. The fifth aspect of the first example method may be implemented in combination with the first, second, third, and/or fourth aspect of the first example method, though the example embodiments are not limited in this respect.

In an example of the fifth aspect of the first example method, the first example method further comprises determining that a distance between the specified location and a second location on the touch screen that corresponds to the pointing device is less than or equal to a threshold distance. In accordance with this example, the first example method further comprises flipping the control interface over to display a plurality of interface elements that are selectable to invoke a plurality of respective functionalities of the touch-enabled device.

In an implementation of this example of the fifth aspect of the first example method, flipping the control interface over comprises flipping the control interface over to display the plurality of interface elements, each interface element of the plurality of interface elements configured to provide a respective menu in response to selection of the respective interface element.

In another implementation of this example of the fifth aspect of the first example method, flipping the control interface over comprises flipping the control interface over to display the plurality of interface elements, each interface element of the plurality of interface elements configured to invoke a respective command with regard to a selected item on the touch screen in response to selection of the respective interface element.

In a sixth aspect of the first example method, the first example method further comprises determining that a plurality of pointing devices is associated with a plurality of respective users. In accordance with the sixth aspect, the determining comprises determining that the pointing device in the hover position is associated with a specified user. In further accordance with the sixth aspect, the determining further comprises determining that the finger input is received from the specified user. In further accordance with the sixth aspect, causing the control interface to be presented comprises causing the control interface to be presented on the touch screen further based on determining that the pointing device in the hover position is associated with the specified user and further based on determining that the finger input is received from the specified user. The sixth aspect of the first example method may be implemented in combination with the first, second, third, fourth, and/or fifth aspect of the first example method, though the example embodiments are not limited in this respect.

In a seventh aspect of the first example method, detecting the finger input comprises detecting the finger input of the finger by the one or more first sensors that are associated with a specified location on the touch screen. In accordance with the seventh aspect, causing the control interface to be presented on the touch screen comprises causing the control interface to be presented at an interface location on the touch screen that is based on the specified location. The seventh aspect of the first example method may be implemented in combination with the first, second, third, fourth, fifth, and/or sixth aspect of the first example method, though the example embodiments are not limited in this respect.

In an eighth aspect of the first example method, the first example method further comprises detecting that the pointing device moves toward the control interface. In accordance with the eighth aspect, the first example method further comprises increasing an opacity of the control interface as the pointing device moves toward the control interface. The eighth aspect of the first example method may be implemented in combination with the first, second, third, fourth, fifth, sixth, and/or seventh aspect of the first example method, though the example embodiments are not limited in this respect.

In an example of the eighth aspect of the first example method, the first example method further comprises setting the opacity of the control interface to be a fixed opacity in response to a distance between the pointing device and the control interface being less than or equal to a threshold distance.

In another example of the eighth aspect of the first example method, detecting the finger input comprises detecting the finger input of the finger by the one or more first sensors that are associated with a specified location on the touch screen. In accordance with this example, the first example method further comprises setting the opacity of the control interface to be a fixed opacity in response to a distance between the pointing device and the specified location being less than or equal to a threshold distance.

In a ninth aspect of the first example method, the first example method further comprises forming the control interface to include a plurality of interface elements, each interface element of the plurality of interface elements configured to provide a respective menu in response to selection of the respective interface element. The ninth aspect of the first example method may be implemented in combination with the first, second, third, fourth, fifth, sixth, seventh, and/or eighth aspect of the first example method, though the example embodiments are not limited in this respect.

In a tenth aspect of the first example method, the first example method further comprises forming the control interface to include a plurality of interface elements, each interface element of the plurality of interface elements configured to invoke a respective command with regard to a selected item on the touch screen in response to selection of the respective interface element. The tenth aspect of the first example method may be implemented in combination with the first, second, third, fourth, fifth, sixth, seventh, eighth, and/or ninth aspect of the first example method, though the example embodiments are not limited in this respect.

In an eleventh aspect of the first example method, detecting the finger input comprises detecting the finger input of the finger by the one or more first sensors that are associated with a specified location on the touch screen. In accordance with the eleventh aspect, detecting the finger input further comprises rotating the control interface about the specified location to track movement of the pointing device with reference to the specified location. The eleventh aspect of the first example method may be implemented in combination with the first, second, third, fourth, fifth, sixth, seventh, eighth, ninth, and/or tenth aspect of the first example method, though the example embodiments are not limited in this respect.

In an example of the eleventh aspect of the first example method, an axis that includes the specified location is defined between a top edge of the touch screen and a bottom edge of the touch screen based on a standard viewing orientation of the touch screen. In accordance with this example, a path along which the control interface rotates intersects the axis at a first intersection point and a second intersection point. In further accordance with this example, the first example method further comprises forming the control interface to include a plurality of interface elements that are arranged in a designated order. In further accordance with this example, the first example method further comprises determining that the control interface is rotated in a first angular direction through the first intersection point in response to forming the control interface to include the plurality of interface elements that are arranged in the designated order. In further accordance with this example, the first example method further comprises rearranging the plurality of interface elements in the control interface to cause the plurality of interface elements to be presented in the control interface in a reversed order that is reverse of the designated order in response to determining that the control interface is rotated in the first angular direction through the first intersection point.

In an implementation of this example of the eleventh aspect of the first example method, the first example method further comprises determining that the control interface is rotated in a second angular direction, which is opposite the first angular direction, through the first intersection point or in the first angular direction through the second intersection point in response to determining that the control interface is rotated in the first angular direction through the first intersection point. In accordance with this implementation, the first example method further comprises rearranging the plurality of interface elements in the control interface to cause the plurality of interface elements to be presented in the control interface in the designated order in response to determining that the control interface is rotated in the second angular direction through the first intersection point or in the first angular direction through the second intersection point.

In another implementation of this example of the eleventh aspect of the first example method, determining that the control interface is rotated in the first angular direction through the first intersection point comprises determining that at least a designated portion of the control interface is rotated in the first angular direction at least a designated number of degrees beyond the first intersection point. In accordance with this implementation, rearranging the plurality of interface elements comprises rearranging the plurality of interface elements in the control interface to cause the plurality of interface elements to be presented in the control interface in the reversed order in response to determining that at least the designated portion of the control interface is rotated in the first angular direction at least the designated number of degrees beyond the first intersection point.

In another example of the eleventh aspect of the first example method, an axis that includes the specified location is defined between a top edge of the touch screen and a bottom edge of the touch screen based on a standard viewing orientation of the touch screen. In accordance with this example, a path along which the control interface rotates intersects the axis at a first intersection point and a second intersection point. In further accordance with this example, the first example method further comprises forming the control interface to include a plurality of interface elements that are arranged in a designated order. In further accordance with this example, the first example method further comprises determining that at least a designated portion of the control interface is rotated in a first angular direction at least a designated number of degrees beyond the first intersection point in response to forming the control interface to include the plurality of interface elements that are arranged in the designated order. In further accordance with this example, the first example method further comprises rearranging the plurality of interface elements in the control interface to cause the plurality of interface elements to be presented in the control interface in a reversed order that is reverse of the designated order in response to determining that at least the designated portion of the control interface is rotated in the first angular direction at least the designated number of degrees beyond the first intersection point. In further accordance with this example, the first example method further comprises determining that at least a specified portion of the control interface is rotated in a second angular direction, which is opposite the first angular direction, at least a specified number of degrees beyond the first intersection point or in the first angular direction at least the specified number of degrees beyond the second intersection point in response to rearranging the plurality of interface elements in the control interface to cause the plurality of interface elements to be presented in the control interface in the reversed order. In further accordance with this example, the first example method further comprises rearranging the plurality of interface elements in the control interface to cause the plurality of interface elements to be presented in the control interface in the designated order in response to determining that at least the specified portion of the control interface is rotated in the second angular direction at least the specified number of degrees beyond the first intersection point or in the first angular direction at least the specified number of degrees beyond the second intersection point.

In yet another example of the eleventh aspect of the first example method, the first example method further comprises determining that a distance between the specified location and a second location on the touch screen that corresponds to the pointing device is less than or equal to a threshold distance. In accordance with this example, the first example method further comprises discontinuing the rotating of the control interface about the specified location to track the movement of the pointing device in response to determining that the distance between the specified location and the second location is less than or equal to the threshold distance.

In still another example of the eleventh aspect of the first example method, the first example method further comprises determining that a distance between the control interface and a designated location on the touch screen that corresponds to the pointing device is less than or equal to a threshold distance. In accordance with this example, the first example method further comprises discontinuing the rotating of the control interface about the specified location to track the movement of the pointing device in response to determining that the distance between the control interface and the designated location is less than or equal to the threshold distance.

In a twelfth aspect of the first example method, the first example method further comprises determine a frequency with which each of a plurality of commands is historically received via the control interface. In accordance with the twelfth aspect, the first example method further comprises forming the control interface to include a plurality of interface elements that corresponds to the plurality of respective commands. In further accordance with the twelfth aspect, the forming comprises arranging the plurality of interface elements in the control interface to have a plurality of respective proximities to a midpoint of the control interface, the plurality of proximities based on the respective frequencies with which the respective commands that correspond to the respective interface elements are historically received via the control interface. The twelfth aspect of the first example method may be implemented in combination with the first, second, third, fourth, fifth, sixth, seventh, eighth, ninth, tenth, and/or eleventh aspect of the first example method, though the example embodiments are not limited in this respect.

In a thirteenth aspect of the first example method, the first example method further comprises determine a frequency with which each of a plurality of commands is historically received via the control interface. In accordance with the thirteenth aspect, the first example method further comprises forming the control interface to include a plurality of interface elements that corresponds to the plurality of respective commands. In further accordance with the thirteenth aspect, the forming comprises arranging the plurality of interface elements in the control interface to have a plurality of respective proximities to a top edge of the touch screen based on a standard viewing orientation of the touch screen, the plurality of proximities based on the respective frequencies with which the respective commands that correspond to the respective interface elements are historically received via the control interface. The thirteenth aspect of the first example method may be implemented in combination with the first, second, third, fourth, fifth, sixth, seventh, eighth, ninth, tenth, eleventh, and/or twelfth aspect of the first example method, though the example embodiments are not limited in this respect.

In a second example method of presenting a control interface on a touch screen that is included in a touch display module of a touch-enabled device based on a multi-input command, a touch input that results from contact of an object with a surface of the touch display module is detected by one or more first sensors of a plurality of sensors that are included in the touch display module. A hover input that results from a pointing device hovering a spaced distance from the touch display module is detected by one or more second sensors of the plurality of sensors. The control interface is caused to be presented via the surface of the touch display module, by at least one processor of the touch-enabled device, based on detecting the touch input and further based on detecting the hover input.

IV. Example Computer System

Figure 16:
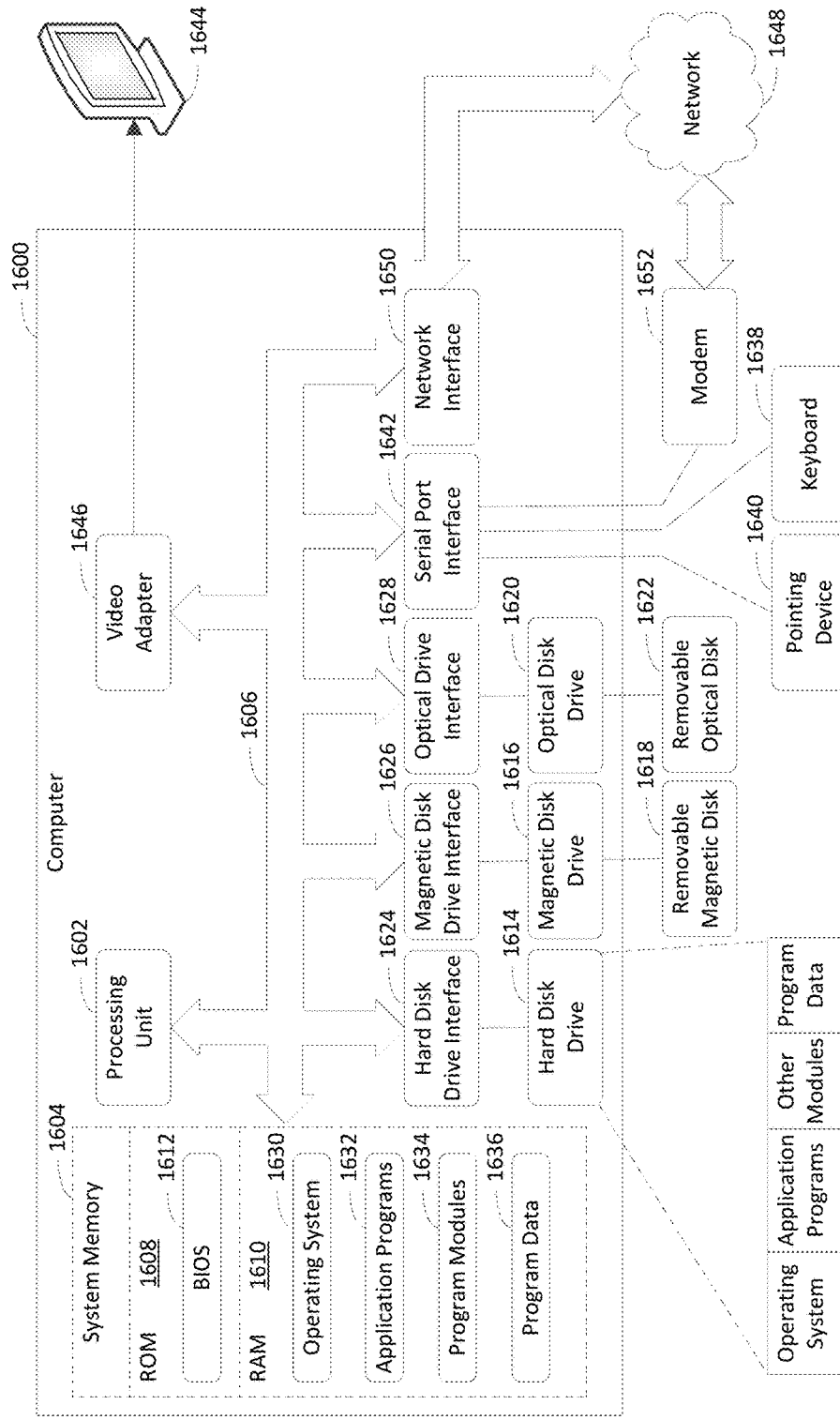
FIG. 16 depicts an example computer in which embodiments may be implemented.

FIG. 16 depicts an example computer 1600 in which embodiments may be implemented. Any one or more of touch-enabled devices 100, 200, 300, 400, 500, 600, 700, 800, and/or 1400 shown in respective FIGS. 1-8 and 14 may be implemented using computer 1600, including one or more features of computer 1600 and/or alternative features. Computer 1600 may be a general-purpose computing device in the form of a conventional personal computer, a mobile computer, or a workstation, for example, or computer 1600 may be a special purpose computing device. The description of computer 1600 provided herein is provided for purposes of illustration, and is not intended to be limiting. Embodiments may be implemented in further types of computer systems, as would be known to persons skilled in the relevant art(s).

As shown in FIG. 16, computer 1600 includes a processing unit 1602, a system memory 1604, and a bus 1606 that couples various system components including system memory 1604 to processing unit 1602. Bus 1606 represents one or more of any of several types of bus structures, including a memory bus or memory controller, a peripheral bus, an accelerated graphics port, and a processor or local bus using any of a variety of bus architectures. System memory 1604 includes read only memory (ROM) 1608 and random access memory (RAM) 1610. A basic input/output system 1612 (BIOS) is stored in ROM 1608.

Computer 1600 also has one or more of the following drives: a hard disk drive 1614 for reading from and writing to a hard disk, a magnetic disk drive 1616 for reading from or writing to a removable magnetic disk 1618, and an optical disk drive 1620 for reading from or writing to a removable optical disk 1622 such as a CD ROM, DVD ROM, or other optical media. Hard disk drive 1614, magnetic disk drive 1616, and optical disk drive 1620 are connected to bus 1606 by a hard disk drive interface 1624, a magnetic disk drive interface 1626, and an optical drive interface 1628, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1630, one or more application programs 1632, other program modules 1634, and program data 1636. Application programs 1632 or program modules 1634 may include, for example, computer program logic for implementing any one or more of multi-input presentation logic 108, 208, 308, 408, 508, 608, 708, 808, and/or 1408, detection logic 1412, causation logic 1414, determination logic 1416, interface logic 1418, size logic 1420, text logic 1422, fold logic 1424, flip logic 1426, opacity logic 1428, rotation logic 1430, arrangement logic 1432, flowchart 900 (including any step of flowchart 900), flowchart 1000 (including any step of flowchart 1000), flowchart 1100 (including any step of flowchart 1100), flowchart 1200 (including any step of flowchart 1200), and/or flowchart 1300 (including any step of flowchart 1300), as described herein.

A user may enter commands and information into the computer 1600 through input devices such as keyboard 1638 and pointing device 1640. Other input devices (not shown) may include a microphone, joystick, game pad, satellite dish, scanner, touch screen, camera, accelerometer, gyroscope, or the like. These and other input devices are often connected to the processing unit 1602 through a serial port interface 1642 that is coupled to bus 1606, but may be connected by other interfaces, such as a parallel port, game port, or a universal serial bus (USB).

A display device 1644 (e.g., a monitor) is also connected to bus 1606 via an interface, such as a video adapter 1646. In addition to display device 1644, computer 1600 may include other peripheral output devices (not shown) such as speakers and printers.

Computer 1600 is connected to a network 1648 (e.g., the Internet) through a network interface or adapter 1650, a modem 1652, or other means for establishing communications over the network. Modem 1652, which may be internal or external, is connected to bus 1606 via serial port interface 1642.

As used herein, the terms "computer program medium" and "computer-readable storage medium" are used to generally refer to media (e.g., non-transitory media) such as the hard disk associated with hard disk drive 1614, removable magnetic disk 1618, removable optical disk 1622, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1632 and other program modules 1634) may be stored on the hard disk, magnetic disk, optical disk, ROM, or RAM. Such computer programs may also be received via network interface 1650 or serial port interface 1642. Such computer programs, when executed or loaded by an application, enable computer 1600 to implement features of embodiments discussed herein. Accordingly, such computer programs represent controllers of the computer 1600.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system to present a control interface based on a multi-input command, the system comprising:
   a touch display module that includes a touch screen and a plurality of sensors; and
   one or more processors coupled to the touch display module, the one or more processors configured to:
      detect a finger input of a finger using one or more first sensors of the plurality of sensors, the one or more first sensors are associated with a specified location on the touch screen;
      detect a pointing device that is in a hover position with regard to the touch display module using one or more second sensors of the plurality of sensors, the hover position characterized by the pointing device being a spaced distance from the touch display module;
      detect movement of the pointing device toward the specified location using the one or more second sensors while the pointing device is within a designated distance from the touch display module; and
      cause a control interface to be presented on the touch screen based on detection of the finger input and further based on the movement of the pointing device being toward the specified location while the pointing device is within the designated distance from the touch display module.

2. The system of claim 1, wherein the one or more second sensors are associated with a designated location on the touch screen; and
   wherein the one or more processors are configured to cause the control interface to be presented on the touch screen further based on a distance between the specified location and the designated location being less than or equal to a threshold distance.

3. The system of claim 1, wherein the control interface includes a plurality of interface elements; and
   wherein the one or more processors are further configured to introduce text proximate the plurality of interface elements in response to a determination that the pointing device moves toward the specified location, the text describing a plurality of actions that is associated with the plurality of respective interface elements, each interface element being selectable to cause the respective action with which the interface element is associated to be performed.

4. The system of claim 1, wherein the one or more processors are further configured to unfold the control interface as the pointing device is moving toward the specified location.

5. The system of claim 4, wherein the one or more processors are configured to:
   determine whether a distance between the specified location and a second location on the touch screen that corresponds to the pointing device is less than or equal to a threshold distance; and
   flip the control interface over to display a plurality of interface elements that are selectable to invoke a plurality of respective functionalities of the touch-enabled device.

6. The system of claim 1, wherein the one or more processors are further configured to:
   determine whether a plurality of pointing devices is associated with a plurality of respective users;
   determine whether the pointing device in the hover position is associated with a specified user;
   determine whether the finger input is received from the specified user; and
   cause the control interface to be presented on the touch screen further based on a determination that the pointing device in the hover position is associated with the specified user and further based on a determination that the finger input is received from the specified user.

7. The system of claim 1, wherein the one or more processors are configured to cause the control interface to be presented at an interface location on the touch screen that is based on the specified location, based on the detection of the finger input and further based on the detection of the pointing device in the hover position.

8. The system of claim 1, wherein the one or more processors are further configured to:
   determine whether the pointing device moves toward the control interface; and increase an opacity of the control interface as the pointing device moves toward the control interface.

9. The system of claim 8, wherein the one or more processors are configured to set the opacity of the control interface to be a fixed opacity in response to a distance between the pointing device and the control interface being less than or equal to a threshold distance.

10. A system comprising:
a touch display module that includes a touch screen and a plurality of sensors; and
one or more processors coupled to the touch display module, the one or more processors configured to:
detect a touch input that results from contact of an object with a surface of the touch display module using one or more first sensors of the plurality of sensors, the one or more first sensors are associated with a specified location on the touch screen;
detect a hover input that results from a pointing device hovering a spaced distance from the touch display module using one or more second sensors of the plurality of sensors;
detect movement of the pointing device toward the specified location using the one or more second sensors while the pointing device is within a designated distance from the touch display module; and
cause a control interface to be presented via the surface of the touch display module based on detection of the touch input and further based on the movement of the pointing device being toward the specified location while the pointing device is within the designated distance from the touch display module.

11. The system of claim 10, wherein the one or more processors are further configured to unfold the control interface as the pointing device is moving toward the specified location.

12. The system of claim 11, wherein the one or more processors are further configured to:
determine whether a distance between the specified location and a second location on the touch screen that corresponds to the pointing device is less than or equal to a threshold distance; and
flip the control interface over to display a plurality of interface elements that are selectable to invoke a plurality of respective functionalities of the touch-enabled device.

13. The system of claim 10, wherein the one or more second sensors are associated with a designated location on the touch screen; and
wherein the one or more processors are configured to cause the control interface to be presented via the surface of the touch display module further based on a distance between the specified location and the designated location being less than or equal to a threshold distance.

14. The system of claim 10, wherein the control interface includes a plurality of interface elements; and
wherein the one or more processors are further configured to introduce text proximate the plurality of interface elements in response to a determination that the pointing device moves toward the specified location, the text describing a plurality of actions that is associated with the plurality of respective interface elements, each interface element being selectable to cause the respective action with which the interface element is associated to be performed.

15. The system of claim 10, wherein the one or more processors are configured to cause the control interface to be presented at an interface location on the touch screen that is based on the specified location, based on the detection of the touch input and further based on detection of the hover input.

16. The system of claim 10, wherein the one or more processors are further configured to:
determine whether the pointing device moves toward the control interface; and
increase an opacity of the control interface as the pointing device moves toward the control interface.

17. The system of claim 16, wherein the one or more processors are configured to set the opacity of the control interface to be a fixed opacity in response to a distance between the pointing device and the control interface being less than or equal to a threshold distance.

18. A method of presenting a control interface on a touch screen that is included in a touch display module of a touch-enabled device based on a multi-input command, the method comprising:
detecting a finger input of a finger by one or more first sensors of a plurality of sensors that are included in the touch display module of the touch-enabled device, the one or more first sensors are associated with a specified location on the touch screen;
detecting a pointing device that is in a hover position with regard to the touch display module by one or more second sensors of the plurality of sensors, the hover position characterized by the pointing device being a spaced distance from the touch display module;
detecting movement of the pointing device toward the specified location using the one or more second sensors while the pointing device is within a designated distance from the touch display module; and
causing a control interface to be presented on the touch screen, by at least one processor of the touch-enabled device, based on detecting the finger input and further based on the movement of the pointing device being toward the specified location while the pointing device is within the designated distance from the touch display module.

19. The method of claim 18, wherein the one or more second sensors are associated with a designated location on the touch screen; and
wherein causing the control interface to be presented on the touch screen comprises:
causing the control interface to be presented on the touch screen further based on a distance between the specified location and the designated location being less than or equal to a threshold distance.

20. The method of claim 18, further comprising:
introducing text proximate a plurality of interface elements that are included in the control interface in response to a determination that the pointing device moves toward the specified location, the text describing a plurality of actions that is associated with the plurality of respective interface elements, each interface element being selectable to cause the respective action with which the interface element is associated to be performed.

* * * * *